US010640687B2

(12) United States Patent
Lewandowski et al.

(10) Patent No.: US 10,640,687 B2
(45) Date of Patent: May 5, 2020

(54) POLYMERIC MATERIALS FORMED USING CONTROLLED RADICAL INITIATORS

(71) Applicant: 3M INNOVATIVE PROPERTIES COMPANY, St. Paul, MN (US)

(72) Inventors: Kevin M. Lewandowski, Inver Grove Heights, MN (US); Babu N. Gaddam, Woodbury, MN (US); Stephen B. Roscoe, Woodbury, MN (US); John L. Battiste, Northfield, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/495,586

(22) PCT Filed: Mar. 23, 2018

(86) PCT No.: PCT/IB2018/051990
§ 371 (c)(1),
(2) Date: Sep. 19, 2019

(87) PCT Pub. No.: WO2018/178829
PCT Pub. Date: Oct. 4, 2018

(65) Prior Publication Data
US 2020/0017727 A1   Jan. 16, 2020

Related U.S. Application Data

(60) Provisional application No. 62/479,660, filed on Mar. 31, 2017.

(51) Int. Cl.
| | |
|---|---|
| *C08F 2/46* | (2006.01) |
| *C08F 2/50* | (2006.01) |
| *C08G 61/04* | (2006.01) |
| *C09J 7/38* | (2018.01) |
| *C08F 293/00* | (2006.01) |
| *C09J 4/06* | (2006.01) |
| *C09J 11/08* | (2006.01) |

(52) U.S. Cl.
CPC ............ *C09J 7/387* (2018.01); *C08F 293/00* (2013.01); *C09J 4/06* (2013.01); *C09J 11/08* (2013.01); *C08F 2810/20* (2013.01); *C09J 2205/102* (2013.01); *C09J 2205/114* (2013.01); *C09J 2433/00* (2013.01); *C09J 2453/00* (2013.01)

(58) Field of Classification Search
CPC . C09J 7/387; C09J 4/06; C09J 2433/00; C09J 2205/114; C09J 11/08; C09J 2205/102; C08F 2810/20; C08F 293/00
USPC ............ 522/27, 7, 6, 1, 71, 189, 184; 520/1
See application file for complete search history.

(56) References Cited

U.S. PATENT DOCUMENTS

| | | | |
|---|---|---|---|
| 2,716,633 | A | 8/1955 | Engelhardt |
| 4,181,752 | A | 1/1980 | Martens |
| 4,329,384 | A | 5/1982 | Vesley |
| 4,330,590 | A | 5/1982 | Vesley |
| 4,379,201 | A | 4/1983 | Heilmann |
| 5,506,279 | A | 4/1996 | Babu |
| 5,773,485 | A | 6/1998 | Bennett |
| 5,773,836 | A | 6/1998 | Hartley |
| 6,153,705 | A | 11/2000 | Corpart |
| 2013/0165606 | A1 | 6/2013 | Prenzel |
| 2014/0288242 | A1 | 9/2014 | Prenzel |
| 2014/0329971 | A1 | 11/2014 | Prenzel |

FOREIGN PATENT DOCUMENTS

| | | | |
|---|---|---|---|
| EP | 0286376 | 10/1988 | |
| EP | 0349270 | 1/1990 | |
| JP | H10-30078 | 2/1998 | |
| WO | WO 2005-068419 | 7/2005 | |
| WO | WO 2018-013330 | 1/2018 | |
| WO | WO-2018013330 A1 * | 1/2018 | ............ C08F 220/10 |
| WO | WO 2018-118905 | 6/2018 | |

OTHER PUBLICATIONS

Destarac, Macromolecular Design via the Interchange of Xanthates (MADIX): Polymerization of Styrene with O-Ethyl Xanthates as Controlling Agents Macromolecular Chemistry and Physics, 2002, vol. 203, pp. 2281-2289.
Destarac, "Madix Technology: From Innovative Concepts to Industrialization", Polymer Preprints, American Chemical Society, Division Polymer Chemistry, 2008, vol. 49, No. 2, pp. 179.
Holsboer, "Synthesis of O-Methyl Thioformate", Recueil des Travaux Chimiques Des Pays Bas, 1972, vol. 91, pp. 1371-1372.
Kuriyama, "Living Radical Polymerization of Methyl Methacrylate with a Tretrafunctional Photoiniferter: Synthesis of a Star Polymer", Polymer Journal, 1984, vol. 16, No. 6, pp. 511-514.
Mattioni, "Prediction of Glass Transition Temperatures from Monomer and Repeat Unit Structure Using Computational Neural Networks", Journal of Chemical Information and Computer Science, 2002, vol. 42, pp. 232-240.
Otsu, "Living Mono- and Biradical Polymerizations in Homogenous System Synthesis of AB and ABA Type Block Copolymers", Polymer Bulletin, 1984, vol. 11, pp. 135-142.
Otsu, "Role of Initiator-Transfer Agent-Terminator (Iniferter) in Radical Polymerizations: Polymer Design by Organic Disulfides as Iniferters", Die Makromolekulare Chemie, Rapid Communications, 1982, vol. 3, pp. 127-132.

(Continued)

*Primary Examiner* — Jessica Whiteley
(74) *Attorney, Agent, or Firm* — Jean A. Lown

(57) ABSTRACT

Controlled radical initiators, reaction mixtures containing the controlled radical initiators and various ethylenically unsaturated monomers, polymeric materials formed from the reaction mixtures, crosslinkable compositions containing the polymeric materials, and crosslinked compositions formed from the crosslinkable compositions are provided. The controlled radical initiators are bis-dithiocarbamate or bis-dithiocarbonate compounds having a single carbon between the two dithiocarbamate or dithiocarbonate groups.

13 Claims, 2 Drawing Sheets

(56) References Cited

OTHER PUBLICATIONS

Taton, Handbook of RAFT Polymerization, 373 (2008).
Tsarevsky, "RAFT Polymerization—Then and Now", Controlled Radical Polymerization: Mechanisms, ACS Symposium Series, American Chemical Society, 2015, pp. 211-246.
International Search Report for PCT International Application No. PCT/IB2018/051990, dated Jun. 18, 2018, 4pgs.

* cited by examiner

POLYMERIC MATERIALS FORMED USING CONTROLLED RADICAL INITIATORS

CROSS REFERENCE TO RELATED APPLICATION

This application is a national stage filing under 35 U.S.C. 371 of PCT/IB2018/051990, filed Mar. 23, 2018, which claims the benefit of U.S. Provisional Patent Application No. 62/479,660, filed Mar. 31, 2017, the disclosure of which is incorporated by reference herein in its entirety.

TECHNICAL FIELD

Controlled radical initiators and polymeric materials formed using controlled radical initiators are provided.

BACKGROUND

The performance characteristics of polymeric materials are determined not only by their composition but also by their molecular architecture. For copolymers, various properties such as melt viscosity, glass transition temperature, and modulus are often a function of the distribution of the different monomeric units along the polymeric chain. Conventional radical polymerization methods have limited utility in synthesizing polymers with precise architectural and structural characteristics.

Controlled radical polymerization methods have been developed that allow the preparation of polymers with well-defined molecular weight, polydispersity, topology, composition, and microstructure. These methods are based on the use of special polymerization mediators, which temporarily and reversibly transform propagating radicals into dormant and/or stable species. These reversible transformations are typically either accomplished by reversible deactivation or by reversible chain transfer. Some of the methods that involve controlled radical polymerization through reversible transformations include iniferter methods, nitroxide mediated polymerization (NMP) methods, atom transfer polymerization (ATRP) methods, and reversible addition-fragmentation (RAFT) methods.

The terms "iniferter" and "photoiniferters" refer to molecules that can act as an initiator, chain transfer agent, and terminator. Various iniferters were discussed in Otsu et al., Makromol. Chem., Rapid Commun., 3, 127-132 (1982). The compound p-xylene bis(N,N-diethyldithiocarbamate) (XDC) has been used to form various acrylic-based block copolymers such as those described in European Patent Applications 0286376 A2 (Otsu et al.) and 0349270 A2 (Mahfuza et al.).

Some polymeric materials have been formed by applying a layer of a crosslinkable composition to the surface of a substrate. The crosslinkable composition can contain a pre-polymer plus additional monomers and a crosslinking agent. Crosslinked compositions can be prepared by exposing the crosslinkable composition to actinic radiation such as ultraviolet radiation. Such polymeric materials and processes are described in U.S. Pat. No. 4,181,752 (Martens et al.), U.S. Pat. No. 4,330,590 (Vesley), U.S. Pat. No. 4,329,384 (Vesley et al.), U.S. Pat. No. 4,379,201 (Heilmann et al.), U.S. Pat. No. 5,506,279 (Babu et al.), U.S. Pat. No. 5,773,836 (Bennett et al.), and U.S. Pat. No. 5,773,485 (Bennett et al.).

SUMMARY

Controlled radical initiators, reaction mixtures containing the controlled radical initiators and various ethylenically unsaturated monomers, polymeric materials formed from the reaction mixtures, crosslinkable compositions containing the polymeric materials, and crosslinked compositions formed from the crosslinkable compositions are provided. The controlled radical initiators are bis-dithiocarbamate or bis-dithiocarbonate compounds having a single carbon between the two dithiocarbamate or dithiocarbonate groups.

In a first aspect, a first reaction mixture is provided. The first reaction mixture includes a) a photoinitiator of Formula (I)

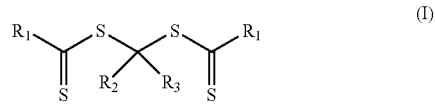

and b) a first monomer composition containing at least one monomer having a single ethylenically unsaturated group. In Formula (I), each group $R_1$ is an alkoxy, aryloxy, alkenoxy, or $-N(R_4)_2$. The group $R_2$ is of formula $-(OR_5)_x-OR_6$. Group $R_3$ is a hydrogen, alkyl, aryl, aralkyl, alkaryl, a group of formula $-(CO)OR_7$, or a group of formula $-(CO)N(R_8)_2$. Each $R_4$ in the group $-N(R_4)_2$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R_5$ is an alkylene and $R_6$ is an alkyl. $R_7$ and each $R_8$ are independently an alkyl, aryl, aralkyl, or alkaryl. The variable x is an integer equal to at least 0.

In a second aspect, a polymeric material of Formula (II) is provided.

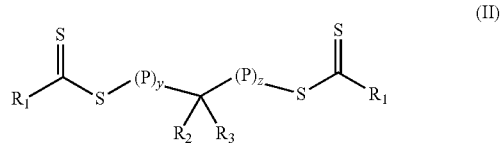

In Formula (II), each group $R_1$ is an alkoxy, aryloxy, alkenoxy, or $-N(R_4)_2$. The group $R_2$ is of formula $-(OR_5)_x-OR_6$. Group $R_3$ is a hydrogen, alkyl, aryl, aralkyl, alkaryl, a group of formula $-(CO)OR_7$, or a group of formula $-(CO)N(R_8)_2$. Each $R_4$ in the group $-N(R_4)_2$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R_5$ is an alkylene and $R_6$ is an alkyl. $R_7$ and each $R_8$ are independently an alkyl, aryl, aralkyl, or alkaryl. Each P is a polymeric block that comprises a polymerized product of a first monomer composition comprising at least one monomer having a single ethylenically unsaturated group. The variable x is an integer equal to at least 0, the variable y is an integer in a range of 1 to 10, and the variable z is an integer in a range of 0 to y.

In a third aspect, a crosslinkable composition is provided that contains a) a polymeric material of Formula (II) as described above in the second aspect and b) a second monomer composition comprising a crosslinking monomer having at least two ethylenically unsaturated groups.

In a fourth aspect, a crosslinked composition is provided. The crosslinked composition includes a cured product of a crosslinkable composition. The crosslinkable composition is the same as described above in the third aspect.

In a fifth aspect, an article is provided that includes a first substrate and a polymeric material layer positioned adjacent to the first substrate. The polymeric material is of Formula (II) as described above in the second aspect.

In a sixth aspect, an article is provided that includes a first substrate and a crosslinkable composition layer adjacent to the first substrate. The crosslinkable composition layer contains the crosslinkable composition described above in the third aspect.

In a seventh aspect, another article is provided that includes a first substrate and a crosslinked composition layer adjacent to the first substrate. The crosslinked composition layer contains the crosslinked composition described above in the fourth aspect.

In an eighth aspect, a compound of Formula (I-3) is provided.

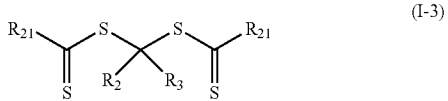

(I-3)

In Formula (I-3), group $R_{21}$ is an aryloxy, alkenoxy, or $—N(R_4)_2$. The group $R_2$ is of formula $—(OR_5)_x—OR_6$. Group $R_3$ is a hydrogen, alkyl, aryl, aralkyl, alkaryl, a group of formula $—(CO)OR_7$, or a group of formula $—(CO)N(R_8)_2$. Each $R_4$ in the group $—N(R_4)_2$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. $R_5$ is an alkylene and $R_6$ is an alkyl. $R_7$ and each $R_8$ are independently an alkyl, aryl, aralkyl, or alkaryl. The variable x is an integer equal to at least 0.

In a ninth aspect, a compound of Formula (I-4) is provided.

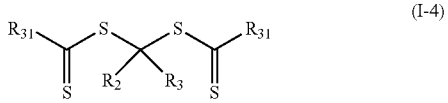

(I-4)

In Formula (I-4), group $R_{31}$ is an alkoxy. The group $R_2$ is of formula $—(OR_5)_x—OR_6$. Group $R_{33}$ is an alkyl, aralkyl, alkaryl, a group of formula $—(CO)OR_7$, or a group of formula $—(CO)N(R_8)_2$. $R_5$ is an alkylene and $R_6$ is an alkyl. $R_7$ and each $R_8$ are independently an alkyl, aryl, aralkyl, or alkaryl. The variable x is an integer equal to at least 0.

DETAILED DESCRIPTION

Figure 1:
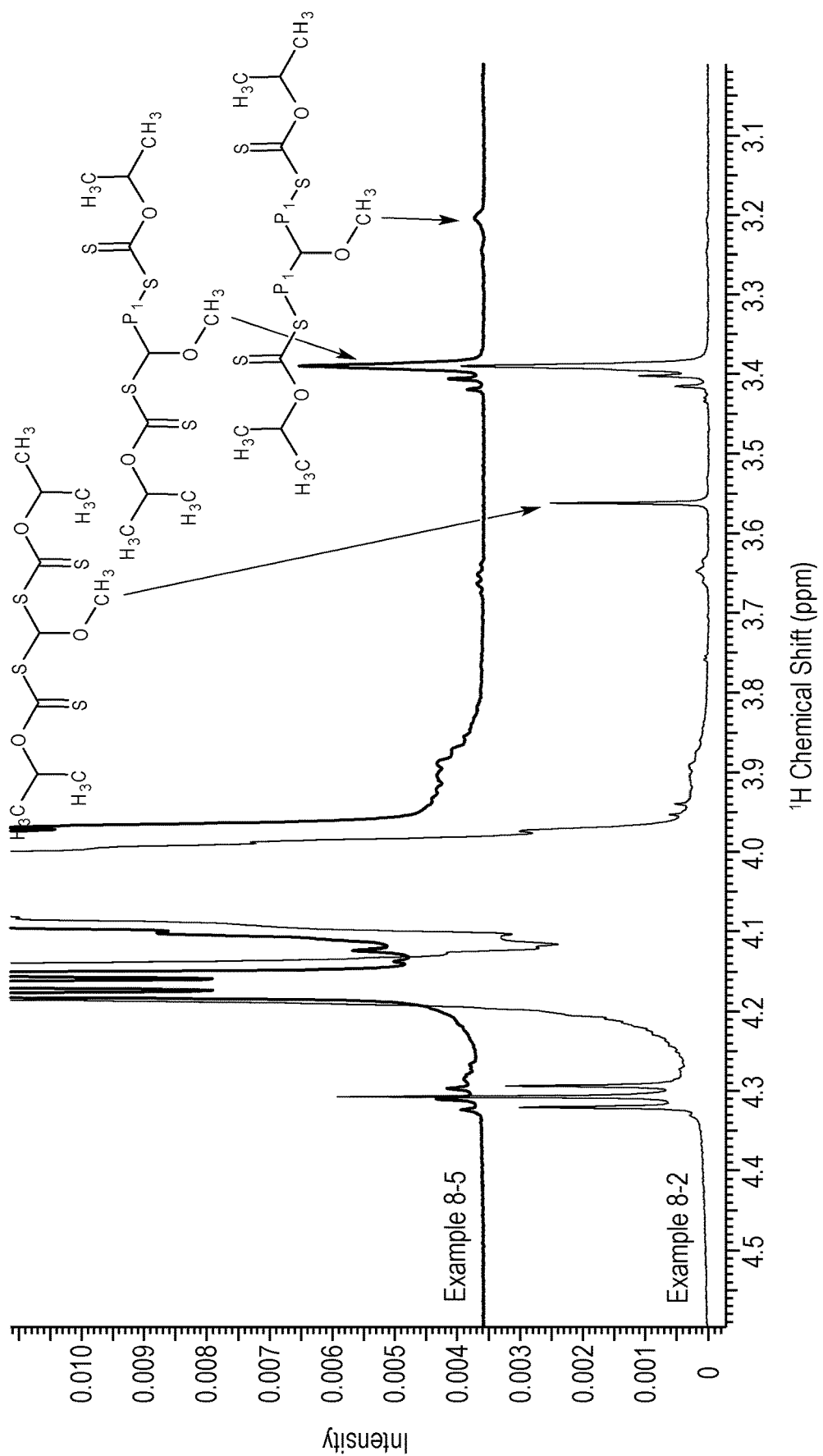
FIG. 1 shows the 3.0 to 4.6 ppm region (which corresponds to the ester and/or ether region) of the $^1H$ NMR spectrum for Example 8.2 at 24 percent conversion and for Example 8.5 at 89 percent conversion (i.e., polymerization) of the monomer.

Controlled radical initiators, reaction mixtures containing the controlled radical initiators and various ethylenically unsaturated monomers, polymeric materials formed from the reaction mixtures, crosslinkable compositions containing the polymeric materials, crosslinked compositions formed from the crosslinkable compositions, and various articles are provided. The controlled radical initiators are bis-dithiocarbamate or bis-dithiocarbonate compounds having a single carbon between the two dithiocarbamate or dithiocarbonate groups.

The controlled radical initiator compounds can be referred to as iniferters because they can function as a controlled radical initiator, transfer agent, and terminator. The controlled radical initiators can be referred to as photoinitiators or photoiniferters because the controlled radical polymerization reaction typically is photolytically induced. The resulting polymeric material formed from the controlled radical initiators have terminal dithiocarbamate or dithiocarbonate groups.

The polymeric materials having well controlled architectures can be formed using these photoinitiator compounds. The polymeric materials can be homopolymers, random copolymers, or block copolymers. Crosslinkable compositions can be prepared that contain the polymeric materials and a monomer composition that includes a crosslinking monomer having at least two ethylenically unsaturated groups. When the crosslinkable composition is exposed to actinic radiation (e.g., ultraviolet region of the electromagnetic spectrum), the polymeric material undergoes chain extension and crosslinking reactions.

The terms "a", "an", and "the" are used interchangeably with "at least one" to mean one or more of the elements being described.

The term "and/or" means either or both. For example, "A and/or B" means only A, only B, or both A and B.

The terms "polymer" and "polymeric material" are used interchangeably and refer to materials formed by reacting one or more monomers. The terms include homopolymers, copolymers, terpolymers, or the like. Likewise, the terms "polymerize" and "polymerizing" refer to the process of making a polymeric material that can be a homopolymer, copolymer, terpolymer, or the like.

The term "alkyl" refers to a monovalent group that is a radical of an alkane. The alkyl group can have 1 to 32 carbon atoms, 1 to 20 carbon atoms, 1 to 12 carbon atoms, or 1 to 6 carbon atoms. The alkyl can be linear, branched, cyclic, or a combination thereof. A linear alkyl has at least one carbon atoms while a cyclic or branched alkyl has at least 3 carbon atoms. In some embodiments, if there are greater than 12 carbon atoms, the alkyl is branched.

The term "alkoxy" refers to a monovalent group of formula $—OR^a$ where $R^a$ is an alkyl as defined above.

The term "alkylene" refers to a divalent group that is a radical of an alkane. The alkylene group can have 1 to 32 carbon atoms, 1 to 20 carbon atoms, 1 to 12 carbon atoms, or 1 to 6 carbon atoms. The alkylene can be linear, branched, cyclic, or a combination thereof. A linear alkylene has at least one carbon atoms while a cyclic or branched alkylene has at least 3 carbon atoms. In some embodiments, if there are greater than 12 carbon atoms, the alkyl is branched.

The term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group usually has 5 to 20 carbon atoms or 6 to 10 carbon atoms.

The term "aralkyl" refers to an alkyl group substituted with at least one aryl group. That is, the aralkyl group is of formula —$R^d$—Ar where $R^d$ is an alkylene and Ar is an aryl. The aralkyl group contains 6 to 40 carbon atoms. The aralkyl group often contains an alkylene group having 1 to 20 carbon atoms and an aryl group having 5 to 20 carbon atoms.

The term "alkaryl" refers to an aryl group substituted with at least one alkyl group. That is, the alkaryl group is of formula —$Ar^1$—$R^e$ where $Ar^1$ is an arylene and $R^e$ is an alkyl. The alkaryl group contains 6 to 40 carbon atoms. The alkaryl group often contain an arylene group having 5 to 20 carbon atoms and an alkyl group having 1 to 20 carbon atoms.

The term "aryloxy" refers to a monovalent group that is of formula —OAr where Ar is an aryl group as defined above.

The term "alkenyl" refers to a monovalent group that is a radical of an alkene, which is a compound having at least one carbon-carbon double bond. In some embodiments, the alkenyl has a single carbon-carbon double bond. In some more specific embodiments, the alkenyl has an ethylenically unsaturated group (the carbon-carbon double bond is between the last two carbon atoms in a chain). The alkenyl can be linear, branched, or cyclic.

The term "alkenyloxy" refers to a monovalent group of formula —$OR^b$ where $R^b$ is an alkenyl as defined above.

The term "(meth)acryloyl" refers to a group of formula $CH_2=CHR^c$—(CO)— where Rc is hydrogen or methyl and the group —(CO)— refers to a carbonyl group.

The term "(meth)acrylate" refers to an acrylate, a methacrylate, or both. Likewise, the term "(meth)acrylamide" refers to an acrylamide, a methacrylamide, or both and the term "(meth)acrylic acid" refers to acrylic acid, methacrylic acid, or both.

The term "heterocyclic ring" refers to a ring structure having at least 1 heteroatom selected from oxygen, nitrogen, or sulfur, wherein the ring structure is saturated or unsaturated. The heterocyclic ring typically has 5 to 7 ring atoms and 1 to 3 heteroatoms. The heterocyclic ring can optionally be fused to one or more second rings that are carbocyclic or heterocyclic and that can be saturated or unsaturated. Any of the rings can optionally be substituted with an alkyl group.

The terms "in a range of" or "in the range of" are used interchangeably to refer to all values within the range plus the endpoints of the range.

Various polymeric materials are prepared using a photoinitiator of Formula (I).

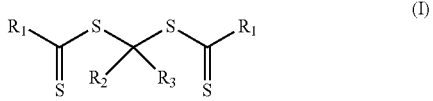

(I)

More particularly, polymeric materials are formed from a reaction mixture that includes both (a) a photoinitiator of Formula (I) and (b) a monomer composition containing at least one monomer having a single ethylenically unsaturated group. Upon exposure to actinic radiation in the ultraviolet region of the electromagnetic spectrum, a polymerization reaction commences.

In Formula (I), each group $R_1$ is an alkoxy, aryloxy, alkenoxy, or —$N(R_4)_2$. The group $R_2$ is of formula —$(OR_5)_x$—$OR_6$. Group $R_3$ is a hydrogen, alkyl, aryl, aralkyl, alkaryl, a group of formula —(CO)$OR_7$, or a group of formula —(CO)$N(R_8)_2$. Each $R_4$ in the group —$N(R_4)_2$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R_5$ is an alkylene and $R_6$ is an alkyl. $R_7$ and each $R_8$ are independently an alkyl, aryl, aralkyl, or alkaryl. The variable x is an integer equal to at least 0.

In some embodiments of Formula (I), group $R_1$ is an alkoxy, aryloxy, or alkenoxy. Suitable alkoxy groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkoxy groups have 1 to 20 carbon atoms, 1 to 10 carbon atoms, 2 to 10 carbon atoms, 1 to 6 carbon atoms, 2 to 6 carbon atoms, or 1 to 4 carbon atoms. Suitable aryloxy groups typically have an aryl group with 5 to 12 carbon atoms, 6 to 12 carbon atoms, or 6 to 10 carbon atoms. In many embodiments, the aryl group is phenyl. Suitable alkenoxy groups typically have at least 2 carbon atoms, at least 3 carbon atoms, or at least 4 carbon atoms and can have up to 20 carbon atoms, up to 18 carbon atoms, up to 16 carbon atoms, up to 12 carbon atoms, up to 10 carbon atoms, or up to 6 carbons. Some example alkenoxy groups have 2 to 20 carbon atoms, 2 to 10 carbon atoms, 2 to 8 carbon atoms, 2 to 6 carbon atoms, or 2 to 4 carbon atoms.

In other embodiments of Formulas (I), group $R_1$ is of formula —$N(R_4)_2$. Each $R_4$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated (e.g., partially or fully unsaturated) and optionally fused to one or more second rings that are carbocyclic or heterocyclic. Suitable alkyl groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. When the formula —$N(R_4)_2$ forms a first heterocyclic ring, the heterocyclic ring typically has a first ring structure with 5 to 7 ring members or 5 to 6 ring members and with 1 to 3 heteroatoms or 1 to 2 heteroatoms in the ring. If there is one heteroatom in the first ring structure, the heteroatom is nitrogen. If there are two or three heteroatoms in the first ring structure, one heteroatom is nitrogen and the any additional heteroatom is selected from nitrogen, oxygen, and sulfur. The first ring optionally can be fused to one or more second rings structure that are heterocyclic or carbocyclic and saturated or unsaturated (e.g., partially or fully unsaturated). If the second ring structure is heterocyclic, it typically has 5 to 7 or 5 to 6 ring members and 1, 2, or 3 heteroatoms selected from nitrogen, oxygen, and sulfur. If the second ring structure is carbocyclic, it is often benzene or a saturated ring having 5 or 6 ring members. In many embodiments, the heterocyclic ring has a single ring structure with 5 or 6 ring members and with either 1 or 2 heteroatoms in the ring. Examples of heterocyclic rings include, but are not limited to, morpholino, thiomorpholino, pyrrolidinyl, piperidinyl, homo-piperidinyl, indolyl, carbazolyl, imidazolyl, and pyrazolyl.

In Formula (I), group $R_2$ is of formula $-(OR_5)_x-OR_6$ where x is an integer equal to at least 0. Stated differently, $R_2$ forms an ether or polyether group with the carbon atom (i.e., the carbon atom between the two dithiocarbamate or dithiocarbonate groups) to which it is attached. In many embodiments, x is equal to 0, at least 1, at least 2, or at least 3 and up to 20 or more, up to 10, up to 8, up to 6, up to 4, or up to 2. For example, x can be in a range of 0 to 20, 0 to 10, 0 to 6, 0 to 4, or 0 to 2. When x is equal to 0, $R_2$ is equal to a group of formula $-OR_6$. Group $R_6$ is an alkyl. Group $R_5$, if present, is an alkylene. Suitable alkyl and alkylene groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl and alkylene groups have 1 to 20 carbon atoms, 1 to 10 carbon atoms, 2 to 10 carbon atoms, 1 to 6 carbon atoms, 2 to 6 carbon atoms, or 1 to 4 carbon atoms.

Group $R_3$ is hydrogen, alkyl, aryl, aralkyl, alkaryl, a group of formula $-(CO)OR_7$ where $R_7$ is an alkyl, aryl, aralkyl, alkaryl, or a group of formula $-(CO)N(R_8)_2$ where each $R_8$ is independently an alkyl, aryl, aralkyl, or alkaryl. In many embodiments, group $R_3$ is hydrogen. Where $R_3$, $R_7$, or $R_8$ is an alkyl, the alkyl group typically has at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. When $R_3$, $R_7$, or $R_8$ is an aryl, the aryl often has 5 to 12 carbon atoms, 6 to 12 carbon atoms, or 6 to 10 carbon atoms. The aryl is often phenyl. When $R_3$, $R_7$, or $R_8$ is an alkaryl, the alkaryl group often contains an arylene group having 5 to 12 carbon atoms, 6 to 12 carbon atoms, or 6 to 10 carbon atoms and an alkyl group having 1 to 10 carbon atoms, 1 to 6 carbon atoms, or 1 to 4 carbon atoms. The arylene group in the alkaryl group is often phenylene or biphenylene. When $R_3$, $R_7$, or $R_8$ is an aralkyl, the aralkyl group often contains an alkyl group having 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The aryl group in the aralkyl group is often phenyl.

The compound of Formula (I) can be formed using any suitable method. One such method is shown in Reaction Scheme A.

Reaction Scheme A

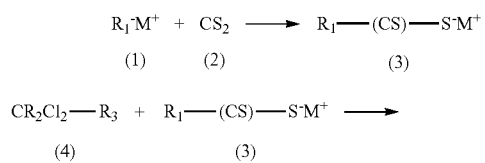

$$[R_1-(CS)-S]_2-CR_2R_3 \quad (5)$$

In reaction II, a compound of formula (4) is reacted with a compound of formula (3) to prepare the compound of formula (5), which corresponds to Formula (I) above. Reaction II is typically conducted at temperatures between about 0° C. and about 80° C. in the presence of an organic solvent such as acetone, acetonitrile, or an alcohol. The compound of formula (3) can be formed, for example, by treating a salt of formula (1) with carbon disulfide (Reaction I). Compound (1) is a salt of an alkoxide, aryloxide, or amine where M+ is an alkali metal, a tetralkyl ammonium ion, a trialkyl ammonium ion, or a dialkylammonium ion.

In some examples of Reaction Scheme A, commercially available compounds of compound (4) are reacted with commercially available compounds of compound (3). Examples of compound (4) include, but are not limited to, dichloromethyl methyl ether, dichloromethyl butyl ether, methyl dichloromethoxyacetate. Examples of compound (3) include, but are not limited to, sodium diethyldithiocarbamate trihydrate and various xanthate salts such as potassium ethyl xanthate, sodium ethyl xanthate, potassium isopropyl xanthate, sodium isopropyl xanthate, and potassium amyl xanthate.

In some embodiments of the photoinitiator of Formula (I) (i.e., Compound (5) in Reaction Scheme A), group $R_1$ is an alkoxy, aryloxy, or alkenoxy of formula $-OR_{13}$ where $R_{13}$ is an alkyl, aryl, or alkenyl. That is the photoinitiator is of Formula (I-1).

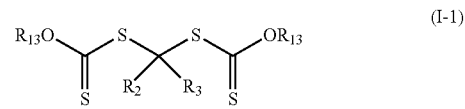

These photoinitiators are bis-dithiocarbonate compounds having a single carbon atom between the two dithiocarbonate groups.

In some more specific compounds of Formula (I-1), $R_{13}$ is an alkyl (i.e., $-OR_{13}$ is an alkoxy), $R_2$ is an alkoxy (i.e., $R_2$ is of formula $-(OR_5)_x-OR_6$ where x is zero, which is equal to $-OR_6$), and $R_3$ is hydrogen. Specific example compounds include, but are not limited to, 1,1-bis(isopropoxycarbothioylsulfanyl)methyl methyl ether, 1,1-bis(isopropoxycarbothioylsulfanyl)methyl butyl ether, or 1,1-bis(ethoxycarbothioylsulfanyl)methyl butyl ether.

In some other more specific compounds of Formula (I-1), $R_{13}$ is an alkenyl (i.e., $-OR_{13}$ is an alkenoxy), $R_2$ is alkoxy, and $R_3$ is hydrogen. A specific example compound includes, but it not limited to, 1,1-bis(10-undecenyloxycarbothioylsulfanyl)methyl ether.

In yet other more specific compounds of Formula (I-1), $R_{13}$ is alkyl, $R_2$ is alkoxy, and $R_3$ is of formula $-(CO)OR_7$ where $R_7$ is an alkyl. A specific example is methyl 2,2-bis(isopropoxycarbothioylsulfanyl)-2-methoxy-acetate.

In some other embodiments of the photoinitiator of Formula (I) (i.e., Compound (5) in Reaction Scheme A), group $R_1$ is of formula $-N(R_4)_2$. That is the photoinitiator is of Formula (I-2).

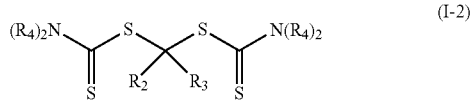

These photoinitiators are bis-dithiocarbamate compounds having a single carbon atom between the two dithiocarbonate groups.

In some more specific compounds of Formula (I-2), $R_4$ is an alkyl, $R_2$ is an alkoxy (i.e., $R_2$ is of formula —$(OR_5)_x$—$OR_6$ where x is zero, which is equal to —$OR_6$), and $R_3$ is hydrogen. Specific example compounds include, but are not limited to, 1,1-bis(diethylcarbamothioylsulfanyl)methyl butyl ether and 1,1-bis(diethylcarbamothioylsulfanyl) methyl methyl ether.

Some suitable photoinitiators of Formula (I) are of Formula (I-3) or Formula (I-4).

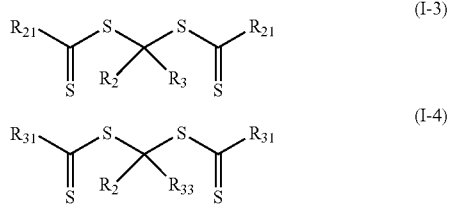

In Formula (I-3), $R_{21}$ is an aryloxy, alkenoxy, or —$N(R_4)_2$. Suitable aryloxy, alkenoxy, and —$N(R_4)_2$ groups for $R_{21}$ are the same as defined for group $R_1$ in Formula (I). Groups $R_2$ and $R_3$ are the same as in Formula (I). In Formula (I-4), $R_{31}$ is an alkoxy. Suitable alkoxy $R_{31}$ groups are the same as defined for group $R_1$ in Formula (I). Group $R_{33}$ is an alkyl, aralkyl, alkaryl, a group of formula —$(CO)OR_7$, or a group of formula —$(CO)N(R_8)_2$. Suitable alkyl, aralkyl, alkaryl, a group of formula —$(CO)OR_7$, or a group of formula —$(CO)N(R_8)_2$ for $R_{33}$ are the same as defined for group $R_3$ in Formula (I). Group $R_2$ is the same as defined for Formula (I).

The photoinitiator of Formula (I) (including those of Formulas (I-1) to (1-4)) is mixed with one or more monomer composition to form a polymeric materials of Formula (II).

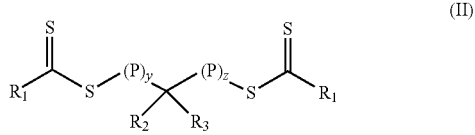

In Formula (II), groups $R_1$, $R_2$, and $R_3$ are the same as defined for the photoinitiator of Formula (I). Each P is a polymeric block that includes a polymerized product of a monomer composition containing at least one monomer having a single ethylenically unsaturated group, y in an integer equal to at least 1 (e.g., in a range of 1 to 10, in a range of 1 to 5, or in a range of 1 to 3), and z is an integer in a range of 0 to y. In many embodiments z is equal to y. The variable z and y refer to the number of polymeric blocks. That is, $(P)_y$ means that there are y polymeric blocks P and $(P)_z$ means that there are z polymeric blocks P.

Each polymeric block P in Formula (II) is the polymerized product of a monomer composition containing at least one monomer having a single ethylenically unsaturated group. Any monomer having a single ethylenically unsaturated group can be used based on the desired properties of the resulting polymeric material. In some embodiments, all of the monomers used to form any polymeric block P have a single (meth)acryloyl group. In other embodiments, all of the monomers used to form any polymeric block P have a single ethylenically unsaturated group that is not a (meth)acryloyl group. In still other embodiments, all of the monomers used to form any polymeric block P have a single ethylenically unsaturated group and some, but not all, of the ethylenically unsaturated groups are (meth)acryloyl groups. Each polymeric block can be a homopolymer or a copolymer. Any monomer can be used alone or in combination with other monomers to form each polymeric block.

Suitable monomers with a single (meth)acryloyl group that can be used to form the polymeric material of Formula (II) include, but are not limited to, alkyl (meth)acrylates, fluorinated alkyl (meth)acrylates, aryl (meth)acrylates, aralkyl (meth)acrylates, substituted aryl (meth)acrylates, (meth)acrylic acid, (meth)acrylamide, N-alkyl (meth)acrylamide, N,N-dialkyl (meth)acrylamide, N-alkylaminoalkyl (meth)acrylate, N,N-dialkylaminoalkyl (meth)acrylate, N-alkylaminoalkyl (meth)acrylamide, N,N-dialkylaminoalkyl (meth)acrylamide, hydroxy-substituted alkyl (meth)acrylates, hydroxy-substituted alkyl (meth)acrylamides, alkoxylated alkyl (meth)acrylate, acid-substituted alkyl (meth)acrylates, acid-substituted alkyl (meth)acrylamides, glycidyl-containing (meth)acrylates, aminosulfonyl-containing (meth)acrylates, cationic monomers such as N,N,N-trialkylaminoalkyl (meth)acrylate, zwitterionic monomers (e.g., 2-(N-3-sulfopropyl-N,N-dimethylammonium)ethyl (meth)acrylate), and mixtures thereof. A plurality of different monomers having a single (meth)acryloyl group can be included in the monomer composition for any polymeric block.

In other embodiments, the reaction mixture used to form any block P in the polymeric material of Formula (II) includes a monomer composition containing a monomer having a single ethylenically unsaturated group that is not a (meth)acryloyl group. Suitable such monomers include, but are not limited to, N-vinylpyrrolidone, N-vinylcaprolactam, vinyl acetate, vinyl methyl ether, vinyl-2-ethylhexanoate, vinyl neodecanoate, styrene, isoprene, butadiene, vinyl dimethylazlactone (VDM), isopropenyl dimethylazlactone (IDM), and vinyl oxazole, and the like.

In Formula (II), the variables y and z refer to the number of polymeric blocks P. The variable y is an integer equal to at least 1 (e.g., in a range of 1 to 10, in a range of 1 to 5, in a range of 1 to 3, or in a range of 1 to 2) and the variable z is an integer in a range of 0 to y. If the variable y is equal to 1, the variable z is equal to 0 or 1. If z is equal to 0, then the resulting polymeric material has a mono-directional polymeric group. That is, there is a polymeric chain only on one side of the divalent group —$C(R_2)(R_3)$— in Formula (II). If z is equal to 1, then the resulting polymeric material has a bi-directional polymeric group. That is, there is a polymeric group on both sides of the divalent group —$C(R_2)(R_3)$— in Formula (II).

Some polymeric materials of Formula (II) are formed from the photoinitiators of Formula (I-1) and are of Formula (II-a).

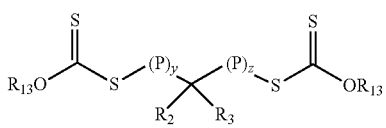

(II-a)

In Formula (II-a), group $R_{13}$ is the same as defined in Formula (I-1). Groups $R_2$, $R_3$, and P as well as the variables y and z are the same as defined in Formulas (I) and (II).

Some polymeric materials of Formula (II) are formed from the photoinitiators of Formula (I-2) and are of Formula (II-b).

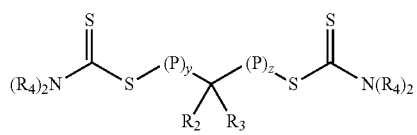

(II-b)

In Formula (II-b), groups $R_2$, $R_3$, $R_4$, and P as well as the variables y and z are the same as defined in Formulas (I) and (II).

Some polymeric materials of Formula (II) are formed from photoinitiators of Formula (I-3) and are of Formula (II-c).

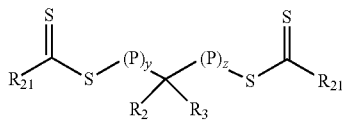

(II-c)

In Formula (II-c), group $R_{21}$ is an aryloxy, alkenoxy, or $-N(R_4)_2$. Groups $R_2$, $R_3$, $R_4$, and P as well as the variables y and z are the same as defined as in Formulas (I) and (II).

Some other polymeric materials of Formula (II) are formed from photoinitiators of Formula (I-4) and are of Formula (II-d).

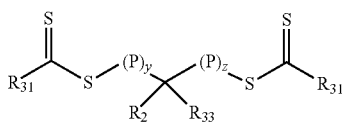

(II-d)

In Formula (II-d), group $R_{31}$ is an alkoxy. Group $R_{33}$ is an alkyl, aralkyl, alkaryl, a group of formula $-(CO)OR_7$, or a group of formula $-(CO)N(R_8)_2$. Groups $R_2$, $R_7$, $R_8$, and P as well as variables y and z are the same as defined in Formulas (I) and (II).

While not wishing to be bound by theory, it is believed that polymerization occurs as shown in Reaction Scheme B to form a material where y is equal to 1 and z is equal to either 0 or 1.

Reaction Scheme B

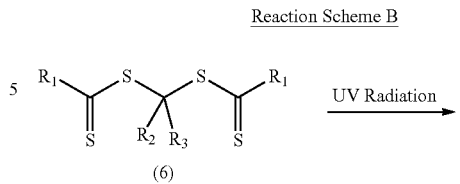

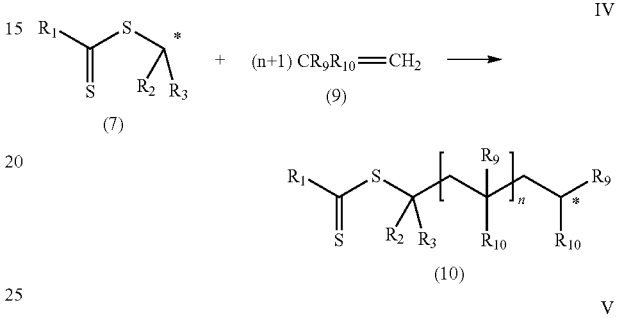

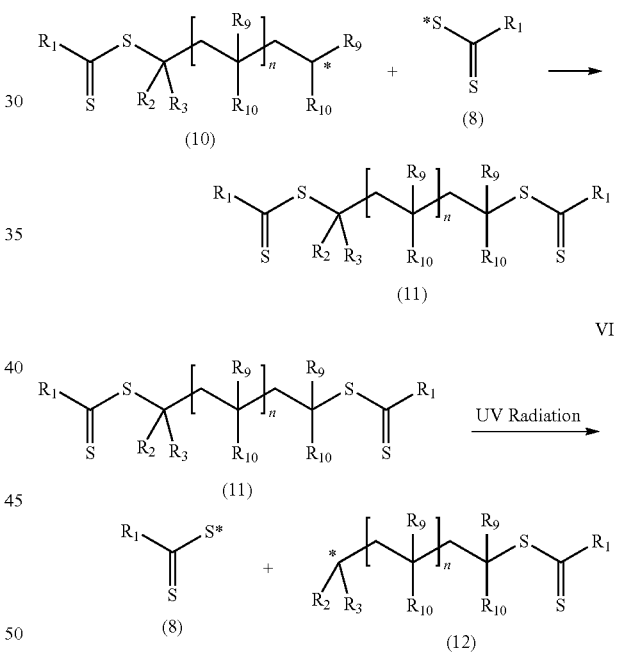

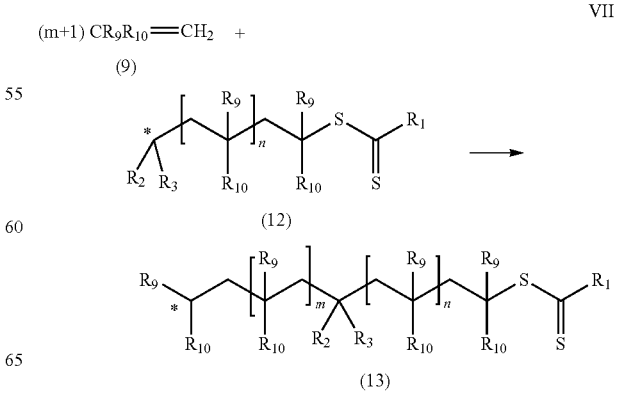

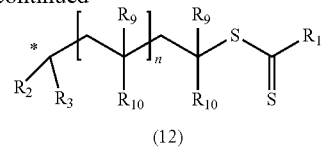

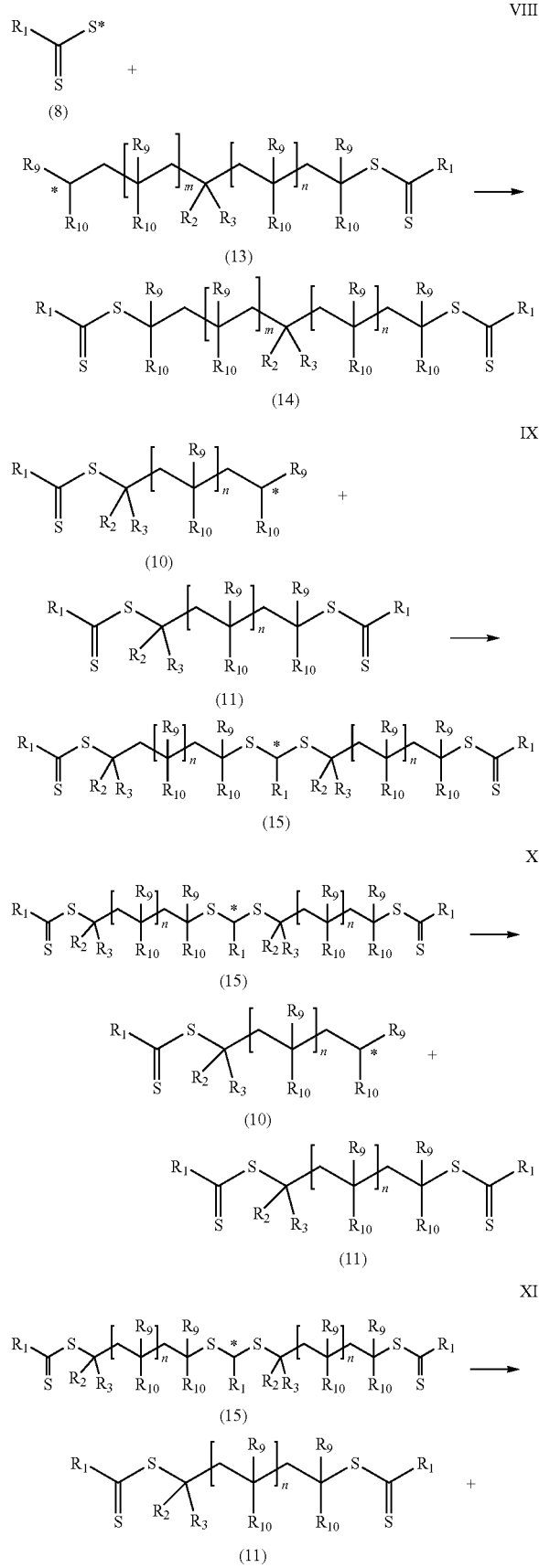

In Reaction Scheme B, the photoinitiator of Formula (I), which is shown as compound (6), undergoes photolysis of one of the C—S bonds when exposed to actinic radiation (e.g., ultraviolet radiation) (Reaction III). Two different radicals, the radical (7) and the radical (8), are formed in Reaction III. In Reaction IV, radical (7) reacts with ethylenically unsaturated monomers (compound (9)). The monomers polymerize and radical (10) is formed. The radical (10) can combine with a radical (8) and the polymerization reaction is terminated. The resulting polymeric material of Reaction V is compound (11). Compound (11) corresponds to the polymeric material of Formula (II) where y is equal to 1 and z is equal to zero (i.e., there is polymeric material on only one side of the —C($R_2$)($R_3$)— group; the polymeric material is mono-directional). Compound (11) can undergo photolysis at one of the C—S bonds in the presence of actinic radiation (e.g., ultraviolet radiation). Photolysis can result in the generation of radical (8) and radical (12) as shown in Reaction VI. In Reaction VII, radical (12) reacts with ethylenically unsaturated monomers (compound 9). The monomers polymerize and radical (13) is formed. The radical (13) can combine with radical (8) and the polymerization reaction is terminated. The resulting polymeric material formed in Reaction VIII is compound (14). Compound (14) corresponds to the polymeric material of Formula (II) where y is equal to 1 and z is equal to 1 (i.e., there is polymeric material on both sides of the —C($R_2$)($R_3$)— group; the polymeric material is bi-directional). While exposure to actinic radiation (e.g., ultraviolet radiation) continues, photolysis of compound (14) can occur and additional monomeric units can be added. When exposure to actinic radiation (e.g., ultraviolet radiation) is terminated, no further photolysis can occur and no additional monomeric units can be added.

Additionally, the dithiocarbonate or dithiocarbamate chain end may be directly transferred between polymeric chains in an addition-fragmentation process. In Reaction IX, for example, radical (10) combines with another molecule of compound (11) to generate radical (15). In Reaction X, radical (15) undergoes homolysis of a carbon-sulfur bond to regenerate radical (10) and compound (11). In Reaction (XI), radical (15) undergoes homolysis on the opposite side of the dithiocarbonate or dithiocarbamate group to generate compound (11) and radical (12), a net transfer of the dithiocarbonate or dithiocarbamate group.

In Reaction Scheme B, compound (9) is a monomer having a single ethylenically unsaturated group. If the ethylenically unsaturated group is a (meth)acryloyl group, $R_9$ is hydrogen or methyl and $R_{10}$ includes a group —(CO)—X—$R_{11}$. Group X is oxy or —$NR_{12}$— where $R_{12}$ is hydrogen or alkyl. Group $R_{11}$ is the remainder of the (meth)acryloyl-containing monomer (i.e., $R_{11}$ is the portion of the monomer that is not a (meth)acryloyl group). That is, the monomer is of formula $H_2C=CR^b$—(CO)—X—$R_{11}$. Group $R^b$ is hydrogen or methyl and group $R_{11}$ is the remainder, for example, of any monomer described herein.

Polymeric materials of Formula (II) with y equal to 1 can be formed by mixing a photoinitiator of Formula (I) with a monomer composition 1A and exposing the resulting reaction mixture 1A to actinic radiation (e.g., ultraviolet light). The actinic radiation exposure causes the photolysis of the photoinitiator and permits controlled radical polymerization of the monomer composition 1A to form a first polymeric block. When exposure to actinic radiation is terminated, the first polymerization reaction ceases. The product of the first polymerization is a polymeric material of Formula (II-1) where $(P)_1$ indicates that there is one polymeric block and $(P)_{0-1}$ indicates that there is zero to one polymeric blocks.

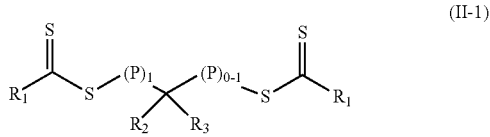

(II-1)

There may be a first polymeric block $P_1$ on only one side of the $—C(R_2)(R_3)—$ group as in the polymeric material of Formula (II-1-1) (i.e., z in Formula (II) is equal to 0) or on both sides of the $—C(R_2)(R_3)—$ group as in the polymeric material of Formula (II-1-2) (i.e., z in Formula (II) is equal to 1). The length of the polymeric chains $P_1$ on either side of the $—C(R_2)(R_3)—$ group in the polymeric material of Formula (II-1-2) can be the same or different.

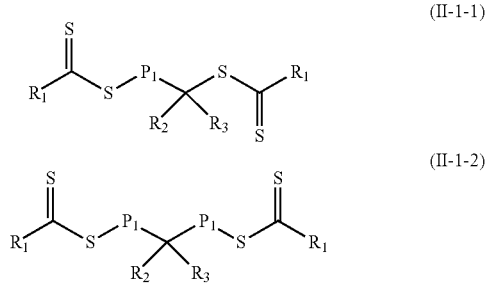

(II-1-1)

(II-1-2)

In some embodiments, particularly when $R_3$ is equal to hydrogen, there may be a polymeric block only on one side of the $—C(R_2)(R_3)—$ group. That is, the variable y is equal to 1 and the variable z is equal to 0 as shown in the polymeric material of Formula (II-I-1). Thus, the photoinitiator can be mono-directional in terms of polymeric chain formation. This can be particularly the situation during the early stages of conversion. As the polymerization reaction proceeds, polymerization may occur on both sides of the $—C(R_2)(R_3)—$ group. That is, the variable y is equal to 1 and the variable z is equal to 1 in the polymeric material of Formula (II) as shown in Formula (II-1-2). In such polymeric material, the size (e.g., the number average molecular weight) of the two polymeric blocks will be different.

In other embodiments, particularly when $R_3$ is equal to a group of formula $—(CO)OR_7$, the photoinitiator can be bi-directional in terms of polymeric chain formation. That is, there will be a polymeric block on both sides of the $—C(R_2)(R_3)—$ group. The variable y is equal to 1 and the variable z is equal to 1 in the polymeric material of Formula (II). Even though there is a polymeric block on either side of the $—C(R_2)(R_3)—$ group, the size (e.g., the number average molecular weight) of the two polymeric blocks can be the same or different.

Another monomer composition, referred to as monomer composition 1B, can be added to the product of the reaction mixture 1A (i.e., the polymeric material of Formula (II-1-1) and/or Formula (II-1-2)) to form a reaction mixture 1B. Upon exposure of the reaction mixture 1B to actinic radiation, photolysis occurs again releasing the radical of formula $R_1—(CS)—S^*$. Monomer composition 1B can polymerize to form a second polymeric block $P_2$ attached to the end of any polymeric block $P_1$ in the polymeric material of Formula (II-1-1) or (II-1-2). When exposure to actinic radiation is terminated, the second polymerization reaction ceases. If there are two polymeric blocks $P_2$, the length of the two polymeric chains can be the same or different. The product of the second polymerization is the polymeric material of Formula (II-2). The designation $(P)_2$ indicates that there are two polymeric blocks and the designation $(P)_{0-2}$ indicates that are 0 to 2 polymeric blocks.

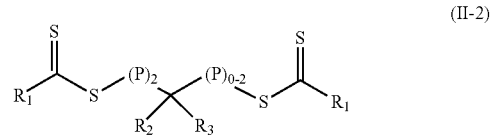

(II-2)

The number of polymeric blocks on each side of the $—C(R_2)(R_3)—$ group in Formula (II-2) can be the same or different. That is, although there can be two blocks on one side of this group, there can be 0, 1 or 2 blocks on the other side. Stated differently, in Formula (II), y is 2 and z is 0, 1, or 2. If a polymeric block is on both sides of the $—C(R_2)(R_3)—$ group, the size (e.g., number average molecular weight) of the polymeric blocks can be the same or different.

This process can be repeated as many times as desired to add additional polymeric blocks. For example, in the polymeric material of Formula (II-3), the designation $(P)_3$ indicates that there are three polymeric blocks (i.e., y is equal to 3 in Formula (II)) and the designation $(P)_{0-3}$ indicates that there are 0 to 3 polymeric blocks (i.e., z is in a range of 0 to 3 in Formula (II)).

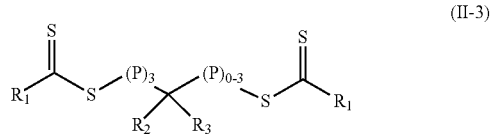

(II-3)

This ability to control the architecture of the resulting polymeric material is particularly advantageous when block copolymers are prepared. By first polymerizing a monomer composition 1A and then polymerizing a monomer composition 1B that is different than monomer composition 1A, a polymeric material composition that is primarily a diblock copolymer, that is primarily a triblock copolymer, or a mixture thereof can be formed depending on the particular photoinitiator that is selected.

A polymeric material composition that is primarily diblock (as shown in the polymeric material of Formula (II-2-1)), particularly in the early stages of conversion, can be formed when the photoinitiator has a $R_3$ group equal to hydrogen. $P_1$ designates a first polymeric block and $P_2$ designates a second polymeric block.

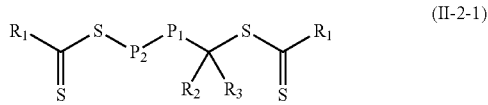

(II-2-1)

A polymeric material composition that is primarily triblock (as shown in the polymeric material of Formula (II-2-2)), particularly in the early stages of conversion, can be formed when the photoinitiator has a $R_3$ group of formula —(CO)OR$_7$. In the triblock of Formula (II-2-2), the two $P_1$ blocks plus the group —C($R_2$)($R_3$)— can be considered to be a single polymeric block.

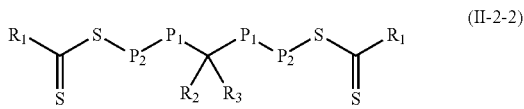

(II-2-2)

For many of the photoinitiators of Formula (I), a mixture of diblock and triblock can be formed.

Each polymeric block (e.g., P, $P_1$, $P_2$, or $P_3$) can have any desired molecular weight. The molecular weight of each block can be the same or different than any other polymeric block. In some embodiments, the weight average molecular weight of any polymeric block is at least 1,000 Daltons, at least 2,000 Daltons, at least 5,000 Daltons, at least 10,000 Daltons, at least 20,000 Daltons, at least 50,000 Daltons, or at least 100,000 Daltons. The weight average molecular weight of any polymeric block can be up to 1 million Daltons or even higher, up to 750,000 Daltons, up to 500,000 Daltons, up to 200,000 Daltons, or up to 100,000 Daltons. In some embodiments, the polymeric material of Formula (II) has an overall weight average molecular weight in a range of 10,000 Daltons to 5 million Daltons, in a range of 10,000 Daltons to 3 million Daltons, or in a range of 10,000 Daltons to 1 million Daltons.

For polymeric materials having multiple polymeric blocks on at least one side of the —C($R_2$)($R_3$)— group, different monomer compositions are typically used for each polymeric block. For example, to prepare a triblock polymeric material of Formula (II-2-2) or the diblock polymeric material of Formula (II-2-1), the first polymeric block $P_1$ is a polymerized product of a monomer composition 1A containing at least one monomer having a single ethylenically unsaturated group. $P_2$ is a second polymeric block that is a polymerized product of a monomer composition 1B containing at least one monomer having a single ethylenically unsaturated group. The composition of the second polymeric block $P_2$ is different than the composition of the first polymeric block $P_1$. If another polymeric block $P_3$ were added that is a polymerized product of a monomer composition 1C, the composition of the third block is usually selected to be different than the second polymeric block $P_2$ and can be selected to be the same or different than the composition of the first polymeric block $P_1$. Stated differently, monomer composition 1A is different than monomer composition 1B and monomer composition 1B is different than monomer composition 1C. Monomer composition 1A can be the same or different than monomer composition 1C. Each polymeric block can be a homopolymer or a copolymer. If any block is a copolymer, it is typically a random copolymer.

To form a polymeric material of Formula (II) where y is equal to 1 and z is equal to 0 or 1, the photoinitiator of Formula (I) is mixed with a monomer composition 1A (i.e., first monomer composition 1A) to form a reaction mixture 1A (i.e., first reaction mixture 1A). Exposing reaction mixture 1A to actinic radiation (e.g., ultraviolet radiation) causes photolysis of the photoinitiator and permits controlled radical polymerization of the monomer composition 1A. When exposure to actinic radiation (e.g., ultraviolet radiation) is terminated, the polymerization reaction ceases. The product of reaction mixture 1A is a polymeric material of Formula (II-1).

More specifically, to prepare a polymeric material of Formula (II-1), monomer composition 1A (e.g., a first monomer composition) is mixed with a photoinitiator of Formula (I) to form reaction mixture 1A. Reaction mixture 1A can be neat (i.e., no solvent is present) or can be mixed with a solvent that dissolves both the monomer composition 1A and the photoinitiator of Formula (I). The solvent can be added, for example, to lower the viscosity of the first reaction mixture. Any solvent that is added is usually selected so that the growing polymeric material is also soluble. In some embodiments, the percent solids in reaction mixture 1A is at least 10 weight percent, at least 20 weight percent, at least 30 weight percent, or at least 40 weight percent and up to 100 weight percent, up to 80 weight percent, or up to 60 weight percent. The amount of solvent added is often selected based on the desired viscosity, particularly the viscosity of the final polymerized material. The desired viscosity is usually sufficiently low so that the final polymeric material can be readily removed from the reactor and/or applied to a substrate.

If a solvent is added, the solvent is often an ester (e.g., ethyl acetate, butyl acetate, and ethylene glycol monomethyl ether acetate), an ether (e.g., dimethyl ether, diethyl ether, ethyl propyl ether, dipropyl ether, methyl t-butyl ether, di-t-butyl ether, dimethoxy ethane, 2-methoxyethanol, diethylene glycol dimethyl ether, dioxane, and tetrahydrofuran), acetonitrile, methylene chloride, an aromatic hydrocarbon (e.g., benzene, xylene, and toluene), or a ketone (e.g., acetone, methyl ethyl ketone, cyclopentanone, and cyclohexanone). Mixtures of solvents can be used. Further, one or more solvents can be combined with water, if miscible. Polymerization of the monomer composition 1A can start at room temperature (e.g., about 20° C. to 25° C.) but can also start, if desired at higher or lower temperatures.

Reaction mixture 1A is exposed to actinic radiation (e.g., ultraviolet radiation) to activate the photoinitiator of Formula (I) and commence controlled radical polymerization of monomer composition 1A. The resulting polymeric block $P_1$ can be a homopolymer or a random copolymer.

Unless the polymeric material will be crosslinked with a crosslinking monomer having at least two ethylenically unsaturated groups, polymerization of reaction mixture 1A is usually allowed to proceed until greater than 80 weight percent, greater than 85 weight percent, greater than 90 weight percent, greater than 95 weight percent, greater than 98 weight percent, greater than 99 weight percent, or 100 weight percent of the monomers in the monomer composition 1A have undergone controlled radical polymerization. Alternatively, unreacted monomers can be removed from the polymerized material. One of skill in the art is familiar with methods of separating the polymeric material from residual monomers.

Alternatively, if the polymeric material will be crosslinked with a monomer having at least two ethylenically unsaturated groups, polymerization of reaction mixture 1A can be allowed to proceed to any desired extent until at least 5 weight percent of the monomer composition 1A has undergone controlled radical polymerization. For example, the polymerization reaction can proceed until at least 10 weight percent, at least 20 weight percent, at least 30 weight percent, at least 40 weight percent and up to 100 weight percent, up to 99 weight percent, up to 98 weight percent, up to 95 weight percent, up to 90 weight percent, up to 85 weight percent, up to 80 weight percent or more, up to 70 weight percent, up to 60 weight percent, or up to 50 weight percent of the monomer composition 1A has undergone controlled radical polymerization. The resulting polymeric material can be combined with a second monomer composition containing a crosslinking monomer having at least two ethylenically unsaturated groups to form a crosslinkable composition.

Polymeric materials having more than one polymeric block can be formed from the polymeric material of Formula (II-1). A monomer composition 1B can be added to the polymeric material of Formula (II-1) to form reaction mixture 1B. Upon exposure of reaction mixture 1B to actinic radiation (e.g., ultraviolet radiation), photolysis occurs again releasing the radical of formula $R_1$—(CS)—S*. Monomer composition 1B can polymerize to form a second polymeric block $P_2$ attached to a first polymeric block $P_1$ in the polymeric material of Formula (II-1). When exposure to actinic radiation (e.g., ultraviolet radiation) is terminated, the polymerization reaction ceases. The product of the reaction mixture 1B is the polymeric material of Formula (II-2).

More specifically, a polymeric material of Formula (II-2) can be formed from the polymeric material of Formula (II-1). After 80 weight percent or more (such as at least 90 weight percent, at least 95 weight percent, at least 98 weight percent, at least 99 weight percent, or 100 weight percent) of the monomer composition 1A has undergone controlled radical polymerization, the polymerization reaction is stopped by terminating exposure to actinic radiation (e.g., ultraviolet radiation). A reaction mixture 1B is formed by adding a monomer composition 1B to the reaction product of the reaction mixture 1A. The reaction mixture 1B includes a first polymeric material of Formula (II) plus a monomer composition 1B having at least one monomer with a single ethylenically unsaturated group. It is typically not necessary to add further photoinitiator of Formula (I) to reaction mixture 1B.

Any optional solvent that is included in reaction mixture 1B is usually selected so that it solubilizes the first polymeric material of Formula (II-1), the photoinitiator of Formula (I), and monomer composition 1B. That is, reaction mixture 1B is typically a single phase. In some embodiments, the percent solids in reaction mixture 1B is selected to have percent solids equal to at least 10 weight percent, at least 20 weight percent, at least 30 weight percent, or at least 40 weight percent and up to 100 weight percent (i.e., no solvent is added), up to 80 weight percent, or up to 60 weight percent. Suitable solvents are the same as those discussed above for the reaction mixture 1A. The amount of solvent added is selected based on the desired viscosity, particularly the viscosity of the final polymerized material. The desired viscosity is usually sufficiently low so that the final polymeric material can be readily removed from the reactor and/or applied to a substrate.

Reaction mixture 1B is exposed to actinic radiation (e.g., ultraviolet radiation) to commence controlled radical polymerization of monomer composition 1B. Polymerization of the second monomer composition can occur at room temperature (e.g., about 20° C. to 25° C.) but can also occur, if desired at higher or lower temperatures.

Unless the polymeric material will be crosslinked with a crosslinking monomer having at least two ethylenically unsaturated groups, the polymerization of reaction mixture 1B is usually allowed to proceed until greater than 80 weight percent, greater than 85 weight percent, greater than 90 weight percent, greater than 95 weight percent, greater than 98 weight percent, greater than 99 weight percent, or 100 weight percent of the monomers in the monomer composition 1B have undergone controlled radical polymerization. Alternatively, unreacted monomers can be removed from the polymerized material. One of skill in the art is familiar with methods of separating the polymeric material from residual monomers.

If the polymeric material will be crosslinked with a crosslinking monomer having at least two ethylenically unsaturated groups, polymerization of reaction mixture 1B can be allowed to proceed to any desired extent until at least 5 weight percent of the monomer composition 1B has undergone controlled radical polymerization. For example, the polymerization reaction can proceed until at least 10 weight percent, at least 20 weight percent, at least 30 weight percent, at least 40 weight percent and up to 100 weight percent, up to 99 weight percent, up to 98 weight percent, up to 95 weight percent, up to 90 weight percent, up to 85 weight percent, up to 80 weight percent or more, up to 70 weight percent, up to 60 weight percent, or up to 50 weight percent of the monomer composition 1B has undergone controlled radical polymerization. The resulting polymeric material can be combined with a second monomer composition containing a crosslinking monomer having at least two ethylenically unsaturated groups to form the crosslinkable composition.

The composition of polymeric block $P_2$ is typically different than the composition of polymeric block $P_1$. In some embodiments, the polymeric blocks $P_1$ and $P_2$ have different glass transition temperatures as measured by Differential Scanning Calorimetry. In some embodiments, the difference in the glass transition temperature of polymeric blocks $P_1$ and $P_2$ is at least 40° C., at least 50° C., at least 60° C., at least 70° C., at least 80° C., at least 90° C., or at least 100° C. It is often preferable, that the polymeric material of Formula (II) is soluble in reaction mixture 1B containing monomer composition 1B used to form the polymeric material of Formula (III).

In some embodiments, it is desirable to have sharp transitions between the first polymeric block $P_1$ and the second polymeric blocks $P_2$. The transition between two polymeric blocks can be controlled by the percent conversion of reaction mixture 1A to the first polymeric block. If the percent conversion is relatively low (e.g., less than 90 percent), then the reaction mixture 1B will include a mixture of the monomer composition 1B plus remaining unreacted monomer composition 1A. That is, some of the monomers from the monomer composition 1A will be in the second polymeric block $P_2$. To minimize the presence of monomeric units of monomer composition 1A in the second polymeric block $P_2$, the percent conversion of the monomer composition 1A should be maximized. A higher percent conversion must be balanced, however, against a longer reaction time. Alternatively, the transition between two polymeric blocks can be controlled by removal of unreacted monomers from the polymerized material. One of skill in the art is familiar with methods of separating the polymeric material from residual monomers.

A polymeric material of Formula (II-3) can be formed from the polymeric material of Formula (II-2). After 80 weight percent or more (such as at least 90 weight percent, at least 95 weight percent, at least 98 weight percent, at least 99 weight percent, or 100 weight percent) of the monomer composition 1B used to form the polymer of Formula (II-2) has undergone controlled radical polymerization, the polymerization reaction is stopped by terminating exposure to actinic radiation (e.g., ultraviolet radiation). A reaction mixture 1C is formed by adding a monomer composition 1C to the reaction product of the reaction mixture 1B. The reaction mixture 1C includes a second polymeric material of Formula (II-2) plus a monomer composition 1C having at least one monomer with a single ethylenically unsaturated group.

Any optional solvent that is included in the reaction mixture 1C is usually selected so that it solubilizes the polymeric material of Formula (II-2), the photoinitiator of Formula (I), and the monomer composition 1C. That is, the reaction mixture 1C is typically a single phase. In some embodiments, the percent solids in the reaction mixture 1C is selected to have percent solids equal to at least 10 weight percent, at least 20 weight percent, at least 30 weight percent, or at least 40 weight percent and up to 100 weight percent (i.e., no solvent is added), up to 80 weight percent, or up to 60 weight percent. Suitable solvents are the same as those discussed above for the reaction mixture 1A. The amount of solvent added is selected based on the desired viscosity, particularly the viscosity of the final polymerized material. The desired viscosity is usually sufficiently low so that the final polymeric material can be readily removed from the reactor and/or applied to a substrate.

The reaction mixture 1C is exposed to actinic radiation (e.g., ultraviolet radiation) to commence controlled radical polymerization of the monomer composition 1C. The resulting $P_3$ block or blocks can be a homopolymer or a random copolymer. Polymerization of the monomer composition 1C can occur at room temperature (e.g., about 20° C. to 25° C.) but can also occur, if desired at higher or lower temperatures. The resulting block $P_3$ can be a homopolymer or a random copolymer.

Unless the polymeric material will be crosslinked with a crosslinking monomer having at least two ethylenically unsaturated groups, polymerization the polymerization of reaction mixture 1C is usually allowed to proceed until greater than 80 weight percent, greater than 85 weight percent, greater than 90 weight percent, greater than 95 weight percent, greater than 98 weight percent, greater than 99 weight percent, or 100 weight percent of the monomers in the monomer composition 1C have undergone controlled radical polymerization. Alternatively, unreacted monomers can be removed from the polymerized material. One of skill in the art is familiar with methods of separating the polymeric material from residual monomers.

If the polymeric material will be crosslinked with a crosslinking monomer having at least two ethylenically unsaturated groups, polymerization of reaction mixture 1C can be allowed to proceed to any desired extent until at least 5 weight percent of the monomer composition 1C has undergone controlled radical polymerization. For example, the polymerization reaction can proceed until at least 10 weight percent, at least 20 weight percent, at least 30 weight percent, at least 40 weight percent and up to 100 weight percent, up to 99 weight percent, up to 98 weight percent, up to 95 weight percent, up to 90 weight percent, up to 85 weight percent, up to 80 weight percent or more, up to 70 weight percent, up to 60 weight percent, or up to 50 weight percent of the monomer composition 1C has undergone controlled radical polymerization. The resulting polymeric material can be combined with a second monomer composition containing a crosslinking monomer having at least two ethylenically unsaturated groups to form the crosslinkable composition.

The composition of polymeric block $P_3$ is typically different than the composition of polymeric block $P_2$, the composition of polymeric block $P_2$ is typically different than the composition of polymeric block $P_1$, and the composition of polymeric block $P_3$ can be the same or different than the composition of polymeric block $P_1$. In some embodiments, the polymeric blocks $P_3$ and $P_2$ have different glass transition temperatures and the polymeric blocks $P_2$ and $P_1$ have different glass transition temperatures as measured by Differential Scanning Calorimetry. In some embodiments, the difference in the glass transition temperature between the polymeric blocks is at least 40° C., at least 50° C., at least 60° C., at least 70° C., at least 80° C., at least 90° C., or at least 100° C.

Additional polymeric blocks can be added to the polymeric material of Formula (II-3) to form polymeric materials of Formula (II) where the variable y is greater than 3 and z is in a range of 0 to y. Each successive precursor polymeric material is added to another monomer composition to form another reaction mixture. The reaction mixture is exposed to actinic radiation such as ultraviolet radiation to form the polymeric material with two additional polymeric blocks as described above.

Adjacent polymeric blocks typically have different compositions, different glass transition temperatures, and different solubility parameters. Because of these differences, a phase separated morphology may result. This phase separation leads to physical crosslinking within the block copolymer and can, for example, increase the cohesive strength of the polymeric material even in the absence of chemical crosslinks.

The resulting polymeric materials of Formula (I) have dithiocarbamate or dithiocarbonate terminal groups. That is, the terminal group is typically $R_3$—(CS)—S—. If desired, this terminal group can be replaced after the polymeric material has formed using known methods such as those described, for example, in (a) Taton et al., *Handbook of RAFT Polymerization*, Barner-Kowollik, ed., Wiley-VCH: Weinheim, 2008, p. 373, (b) Destarac et al., *Polym. Prepr. (Am. Chem. Soc., Div. Polym. Chem.)*, 2008, 49(2), (c) Destarac, *Polymer Preprints*, 2008, 49(2), page 179, and (d) Tsarevsky et al., *In Controlled Radical Polymerization: Mechanisms*, ACS Symposium Series, American Chemical Society, Washington, D.C., 2015, 211-246. Suitable methods include, for example, converting the dithiocarbamate or dithiocarbonate functionality into a thiol end group through reaction with nucleophiles. The polymeric material with the thiol end group can undergo various radical reactions (e.g., radical catalyzed thiol-ene reactions and radical catalyzed thiol-yne reactions), nucleophilic reactions (e.g., thiol-ene Michael addition reactions, thiol-epoxy reactions, thiol-halide reactions, thiol-isocyanate reactions), or sulfur exchange reactions (e.g., thiol-alkanethiosulfonate reactions and thiol-pyridyl disulfide reactions). Other example methods include free-radical reductive cleavage of the dithiocarbamate or dithiocarbonate groups, oxidation with peroxide and ozone, and aminolysis using an amine or ammonia.

The amount of the photoinitiator of Formula (I) included in the reaction mixture for any block impacts the weight average molecular weight of the resulting polymeric block. That is, the weight average molecular weight can be controlled based on the amount of photoinitiator added to the reaction mixture. The amount of photoinitiator is typically in a range of 0.001 to 15 weight percent based on the weight of the monomers in the reaction mixture. For comparable reaction conditions, increasing the amount of photoinitiator tends to decrease the weight average molecular weight (as well as the number average molecular weight). The amount of the photoinitiator is typically at least 0.001 weight percent, at least 0.005 weight percent, at least 0.01 weight percent, at least 0.02 weight percent, at least 0.03 weight percent, or at least 0.5 weight percent and can be up to 15 weight percent, up to 12 weight percent, up to 10 weight percent, up to 8 weight percent, up to 6 weight percent, up to 5 weight percent, up to 3 weight percent, up to 2 weight percent, or up to 1 weight percent. This amount of photoinitiator often results in the formation of polymeric blocks having a weight average molecular weight in a range of 1,000 to 3,000,000 Daltons or in the range of 1,000 to 1 million Daltons.

The reaction mixtures used to form the polymeric material of Formula (II) typically do not include a chain transfer agent (such as mercaptans and carbon tetrabromide). Chain transfer agents are not needed to control the molecular weight of the resulting polymeric material. Rather, the molecular weight can be varied and controlled through selection of the desired amount of the photoinitiator of Formula (I) and of the desired reaction temperature.

For crosslinking, the polymeric material of Formula (II) (e.g., the polymeric material of Formula (II-1), (II-2), or (II-3)) is combined with a second monomer composition to provide a crosslinkable composition. The second monomer composition contains a crosslinking monomer having at least two ethylenically unsaturated groups. Optionally, the second monomer composition can also include one or more monomers having a single ethylenically unsaturated group. The polymeric material can have any desired number of polymeric blocks.

The polymeric material of Formula (II) that is combined with the second monomer composition in the crosslinkable composition can have any desired extent of polymerization in the outer block (e.g., polymer block $P_1$ in Formulas (II-1-1) and (II-1-2) and polymer block $P_2$ in Formulas (II-2-1) and (II-2-2). In some embodiments, the outer blocks are fully polymerized (e.g., the outer blocks are greater than 99 weight percent polymerized based on the weight of monomers used to form the outer block), nearly fully polymerized (e.g., the outer blocks are at least 80 to 99 weight percent polymerized based on the weight of the monomers used to form the outer blocks), or are partially polymerized (e.g., 5 to 80 weight percent polymerized based on the weight of the monomers used to form the outer blocks). Polymeric material of Formula (II) with partially polymerized outer blocks are referred to as "syrup polymers".

Syrup polymers often includes 5 to 80 weight percent polymeric material of Formula (II) and 20 to 95 weight percent monomer having a single ethylenically unsaturated group based on a total weight of polymerized (i.e., reacted monomers) and polymerizable material (i.e., unreacted monomers). In some embodiments, the syrup polymer contains 10 to 80 weight percent polymeric material of Formula (II) and 20 to 90 weight percent monomer having a single ethylenically unsaturated group, 10 to 70 weight percent polymeric material of Formula (II) and 30 to 90 weight percent monomer having a single ethylenically unsaturated group, 10 to 60 weight percent polymeric material of Formula (II) and 40 to 90 weight percent monomer having a single ethylenically unsaturated group, 10 to 50 weight percent polymeric material of Formula (II) and 50 to 90 weight percent monomer having a single ethylenically unsaturated group, 10 to 40 weight percent polymeric material of Formula (II) and 60 to 90 weight percent monomer having a single ethylenically unsaturated group, 20 to 50 weight percent polymeric material of Formula (II) and 50 to 80 weight percent monomer having a single ethylenically unsaturated group, or 20 to 40 weight percent polymeric material of Formula (II) and 60 to 80 weight percent monomer having a single ethylenically unsaturated group. The amounts are based on a total weight of polymerized and polymerizable material.

If a syrup polymer is used in the crosslinkable composition, the second monomer composition includes a crosslinking monomer plus unreacted monomers (i.e., monomers having a single ethylenically unsaturated group) that were present when the polymer of Formula (II) was formed. Optionally, the second monomer composition can further include other monomers having a single ethylenically unsaturated group that were not present when the polymer of Formula (I) was formed.

Suitable crosslinking monomers often contain at least two (meth)acryloyl groups, which are often acryloyl groups. Exemplary crosslinking monomers with two (meth)acryloyl groups include 1,2-ethanediol diacrylate, 1,3-propanediol diacrylate, 1,4-butanediol diacrylate, 1,4-butanediol diacrylate, 1,6-hexanediol diacrylate (HDDA), 1,9-nonanediol diacrylate, 1,12-dodecanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, and neopentylglycol hydroxypivalate diacrylate modified caprolactone. Exemplary crosslinking monomers with three or four (meth)acryloyl groups include, but are not limited to, trimethylolpropane triacrylate (e.g., commercially available under the trade designation TMPTA-N from Surface Specialties, Smyrna, Ga. and under the trade designation SR-351 from Sartomer, Exton, Pa.), pentaerythritol triacrylate (e.g., commercially available under the trade designation SR-444 from Sartomer), tris(2-hydroxyethylisocyanurate) triacrylate (commercially available under the trade designation SR-368 from Sartomer), a mixture of pentaerythritol triacrylate and pentaerythritol tetraacrylate (e.g., commercially available from Surface Specialties under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinking monomer with five (meth)acryloyl groups includes, but is not limited to, dipentaerythritol pentaacrylate (e.g., commercially available under the trade designation SR-399 from Sartomer).

Regardless of whether the polymeric material of Formula (II) is a syrup polymer, a nearly fully polymerized polymeric material, or a fully polymerized polymeric material, the crosslinkable composition usually includes 0.01 to 20 weight percent crosslinking monomer based on a total weight of polymerized and polymerizable material. In many embodiments, the crosslinkable composition contains at least 0.05 weight percent, at least 0.1 weight percent, at least 0.5 weight percent, or at least 1 weight percent and up to 15 weight percent, up to 10 weight percent, up to 5 weight percent, or up to 1 weight percent crosslinking monomer based on the total weight of polymerized and polymerizable material. Any other monomers included in the crosslinkable composition have a single ethylenically unsaturated group.

Thus, the overall crosslinkable composition contains 5 to 99.99 weight percent polymeric material of Formula (II) and a second monomer composition containing 1) 0.01 to 20 weight percent crosslinking monomer having at least two ethylenically unsaturated groups and 2) 0 to 95 weight percent monomer having a single ethylenically unsaturated group. In some embodiments, the crosslinkable composition contains 10 to 99.99 weight percent polymeric material of Formula (II) and a second monomer composition containing 1) 0.01 to 10 weight percent crosslinking monomer having at least two ethylenically unsaturated groups and 2) 0 to 90 weight percent (0 to 89.99 weight percent) monomers having a single ethylenically unsaturated group. In other embodiments, the crosslinkable composition contains 10 to 80 weight percent polymeric material of Formula (II) and a second monomer composition containing 1) 0.01 to 10 weight percent crosslinking monomer having at least two ethylenically unsaturated groups and 2) 10 to 90 weight percent monomers (10 to 89.99 weight percent) having a single ethylenically unsaturated group. In still other embodiments, the crosslinkable composition contains 10 to 60 weight percent polymeric material of Formula (II) and a second monomer composition containing 1) 0.01 to 10 weight percent crosslinking monomer having at least two ethylenically unsaturated groups and 2) 30 to 90 weight percent (30 to 89.99 weight percent) monomers having a single ethylenically unsaturated group. In yet other embodiments, the crosslinkable composition contains 10 to 40 weight percent polymeric material of Formula (II) and a second monomer composition containing 1) 0.01 to 10 weight percent crosslinking monomer having at least two ethylenically unsaturated groups and 2) 50 to 90 weight percent (50 to 89.99 weight percent) monomers having a single ethylenically unsaturated group. The amounts are based on a total weight of polymerized and polymerizable material in the crosslinkable composition. In a still further embodiment, the crosslinkable composition contains 10 to 40 weight percent polymeric material of Formula (II) and a second monomer composition containing 1) 0.01 to 5 weight percent crosslinking monomer having at least two ethylenically unsaturated groups and 2) 55 to 90 weight percent (55 to 89.99 weight percent) monomers having a single ethylenically unsaturated group. The amounts are based on a total weight of polymerized and polymerizable material.

In some particular embodiments, the polymeric material of Formula (II) is selected so that the final crosslinked composition is suitable for use as a pressure-sensitive adhesive composition. Although the polymeric material included in a pressure-sensitive adhesive can have multiple polymeric blocks, the polymeric material often contains a single polymeric block. That is, the variable y in Formula (II) is equal to 1, which is equivalent to the polymeric material of Formula (II-1).

For use as a pressure-sensitive adhesive, the monomers selected to form the polymeric material of Formula (II) are those that will result in an elastomeric material. The elastomeric material typically has a glass transition temperature (Tg) that is no greater than 20° C., no greater than 10° C., no greater than 0° C., no greater than −10° C., no greater than −20° C., no greater than −30° C., no greater than −40° C., or no greater than −50° C. The glass transition temperature can be measured using techniques such as Differential Scanning Calorimetry and Dynamic Mechanical Analysis. Alternatively, the glass transition temperature can be estimated using the Fox equation. Lists of glass transition temperatures for homopolymers are available from multiple monomer suppliers such as from BASF Corporation (Houston, Tex., USA), Polyscience, Inc. (Warrington, Pa., USA), and Aldrich (Saint Louis, Mo., USA) as well as in various publications such as, for example, Mattioni et al., J. Chem. Inf. Comput. Sci., 2002, 42, 232-240.

To form an elastomeric polymeric material of Formula (II-1), the monomeric composition 1A, which is herein also referred to as the first monomer composition, often contains at least one low Tg monomer. As used herein, the term "low Tg monomer" refers to a monomer having a Tg no greater than 20° C. when homopolymerized (i.e., a homopolymer formed from the low Tg monomer has a Tg no greater than 20° C.). Suitable low Tg monomers are often selected from an alkyl (meth)acrylates, heteroalkyl (meth)acrylates, aryl substituted alkyl acrylate, and aryloxy substituted alkyl acrylates.

Example low Tg alkyl (meth)acrylate monomers often are non-tertiary alkyl acrylates but can be an alkyl methacrylates having a linear alkyl group with at least 4 carbon atoms. Specific examples of alkyl (meth)acrylates include, but are not limited to, methyl acrylate, ethyl acrylate, n-propyl acrylate, n-butyl acrylate, n-butyl methacrylate, isobutyl acrylate, sec-butyl acrylate, n-pentyl acrylate, 2-methylbutyl acrylate, n-hexyl acrylate, cyclohexyl acrylate, 4-methyl-2-pentyl acrylate, 2-methylhexyl acrylate, 2-ethylhexyl acrylate, n-octyl acrylate, 2-octyl acrylate, isooctyl acrylate, isononyl acrylate, isoamyl acrylate, n-decyl acrylate, isodecyl acrylate, n-decyl methacrylate, lauryl acrylate, isotridecyl acrylate, n-octadecyl acrylate, isostearyl acrylate, and n-dodecyl methacrylate.

Example low Tg heteroalkyl (meth)acrylate monomers often have at least 3 carbon atoms, at least 4 carbon atoms, or at least 6 carbon atoms and can have up to 30 or more carbon atoms, up to 20 carbon atoms, up to 18 carbon atoms, up to 16 carbon atoms, up to 12 carbon atoms, or up to 10 carbon atoms. Specific examples of heteroalkyl (meth)acrylates include, but are not limited to, 2-ethoxyethyl acrylate, 2-(2-ethoxyethoxy)ethyl acrylate, 2-methoxyethyl (meth) acrylate, and tetrahydrofurfuryl (meth)acrylate.

Exemplary aryl substituted alkyl acrylates or aryloxy substituted alkyl acrylates include, but are not limited to, 2-biphenylhexyl acrylate, benzyl acrylate, 2-phenoxyethyl acrylate, and 2-phenylethyl acrylate.

Monomer composition 1A (i.e. first monomer composition) used in reaction mixture 1A, which is herein also referred to as the "first reaction mixture", for forming a polymeric material of Formula (II) often contains at least 40 weight percent of a low Tg monomer based on a total weight of monomers in monomer composition 1A. In some embodiment, the monomer composition 1A contains at least 45 weight percent, at least 50 weight percent, at least 60 weight percent, at least 65 weight percent, at least 70 weight percent, at least 75 weight percent, or at least 80 weight percent and up to 100 weight percent, up to 99 weight percent, up to 98 weight percent, up to 95 weight percent, up to 90 weight percent, or up to 85 weight percent of the low Tg monomer.

Some monomer compositions 1A can include an optional polar monomer. The polar monomer has an ethylenically unsaturated group plus a polar group such as acidic groups or a salts thereof, a hydroxyl group, a primary amido group, a secondary amido group, a tertiary amido group, or an amino group. Having a polar monomer often facilitates adherence of the pressure-sensitive adhesive to a variety of substrates.

Exemplary polar monomers with an acidic group include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinyl phosphonic acid, and mixtures thereof. Due to their availability, the acid monomers are often (meth)acrylic acids.

Exemplary polar monomers with a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), hydroxyalkyl (meth)acrylamides (e.g., 2-hydroxyethyl (meth)acrylamide or 3-hydroxypropyl (meth)acrylamide), ethoxylated hydroxyethyl (meth)acrylate (e.g., monomers commercially available from Sartomer (Exton, Pa., USA) under the trade designation CD570, CD571, and CD572), and aryloxy substituted hydroxyalkyl (meth)acrylates (e.g., 2-hydroxy-2-phenoxypropyl (meth)acrylate).

Exemplary polar monomers with a primary amido group include (meth)acrylamide. Exemplary polar monomers with secondary amido groups include, but are not limited to, N-alkyl (meth)acrylamides such as N-methyl (meth)acrylamide, N-ethyl (meth)acrylamide, N-isopropyl (meth)acrylamide, N-tert-octyl (meth)acrylamide, or N-octyl (meth)acrylamide.

Exemplary polar monomers with a tertiary amido group include, but are not limited to, N-vinyl caprolactam, N-vinyl-2-pyrrolidone, (meth)acryloyl morpholine, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Polar monomers with an amino group include various N,N-dialkylaminoalkyl (meth)acrylates and N,N-dialkylaminoalkyl (meth)acrylamides. Examples include, but are not limited to, N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide.

The amount of the optional polar monomer is often in a range of 0 to 30 weight percent based on the weight of monomers in monomer composition 1A (i.e., first monomer composition). If present, the amount of polar monomers in the first monomer composition is often at least 0.1 weight percent, at least 0.5 weight percent, or at least 1 weight percent based on the total weight of monomers in monomer composition 1A. The amount can be up to 30 weight percent, up to 25 weight percent, up to 20 weight percent, up to 15 weight percent, up to 10 weight percent, or up to 5 weight percent. For example, the amount is often in a range of 0 to 30 weight percent, in a range of 0 to 20 weight percent, in a range of 0 to 15 weight percent, in a range of 0 to 10 weight percent, in a range of 0 to 5 weight percent, in a range of 0.5 to 15 weight percent, in a range of 1 to 15 weight percent, or in a range of 1 to 10 weight percent based on a total weight of monomers in monomer composition 1A.

Monomer composition 1A (i.e., first monomer composition) can optionally include a high Tg monomer. As used herein, the term "high Tg monomer" refers to a monomer that has a Tg greater than 30° C., greater than 40° C., or greater than 50° C. when homopolymerized (i.e., a homopolymer formed from the monomer has a Tg greater than 30° C., greater than 40° C., or greater than 50° C.). Some suitable high $T_g$ monomers have a single (meth)acryloyl group such as, for example, methyl methacrylate, ethyl methacrylate, n-propyl methacrylate, isopropyl methacrylate, n-butyl methacrylate, isobutyl methacrylate, sec-butyl methacrylate, tert-butyl (meth)acrylate, cyclohexyl methacrylate, isobornyl (meth)acrylate, stearyl (meth)acrylate, phenyl acrylate, benzyl methacrylate, 3,3,5 trimethylcyclohexyl (meth)acrylate, 2-phenoxyethyl methacrylate, N-octyl (meth)acrylamide, and mixtures thereof. Other suitable high Tg monomers have a single vinyl group that is not a (meth)acryloyl group such as, for example, various vinyl ethers (e.g., vinyl methyl ether), vinyl esters (e.g., vinyl acetate and vinyl propionate), styrene, substituted styrene (e.g., a-methyl styrene), vinyl halide, and mixtures thereof. Vinyl monomers having a group characteristic of polar monomers are considered herein to be polar monomers.

The amount of high Tg monomer used to form the polymeric material of Formula (II) can be up to 50 weight percent or even higher provided that the Tg of the polymeric material is no greater than 20° C. In some embodiments, the amount can be up to 40 weight percent, up to 30 weight percent, up to 20 weight percent, up to 15 weight percent, or up to 10 weight percent. The amount can be at least 1 weight percent, at least 2 weight percent, or at least 5 weight percent. For example, the amount can be in a range of 0 to 50 weight percent, 0 to 40 weight percent, 0 to 30 weight percent, 0 to 20 weight percent, 0 to 10 weight percent, 1 to 30 weight percent, 1 to 20 weight percent, or 1 to 10 weight percent. The amount values are based on a total weight of monomers in monomer composition 1A (i.e., first monomer composition).

Still further, monomer composition 1A (i.e., first monomer composition) can optionally include a vinyl monomer (i.e., a monomer with an ethylenically unsaturated group that is not a (meth)acryloyl group). Examples of optional vinyl monomers include, but are not limited to, various vinyl ethers (e.g., vinyl methyl ether), vinyl esters (e.g., vinyl acetate and vinyl propionate), styrene, substituted styrene (e.g., a-methyl styrene), vinyl halide, and mixtures thereof. The vinyl monomers having a group characteristic of polar monomers are considered herein to be polar monomers.

The amount of the optional vinyl monomer lacking a (meth)acryloyl group is often in a range of 0 to 15 weight percent based on the weight of monomers in monomer composition 1A (i.e. the first monomer composition). If present, the amount of vinyl monomers in the first monomer composition is often at least 0.1 weight percent, 0.2 weight percent, 0.5 weight percent, or 1 weight percent based on the total weight of monomers in the first monomer composition. The amount can be up to 15 weight percent, up to 10 weight percent, or up to 5 weight percent. For example, the amount is often in a range of 0 to 15 weight percent, in a range of 0.1 to 10 weight percent, in a range of 0.5 to 5 weight percent, or in a range of 1 to 5 weight percent based on a total weight of monomers in the first monomer composition.

Overall the elastomeric polymeric material of Formula (II-1) can be formed from a first monomer composition that includes up to 100 weight percent of the low Tg monomer. In some embodiments, the first monomer composition contains 100 weight percent low Tg monomer based on the total weight of monomers in the first monomer composition. In other embodiments, the first monomer composition contains 40 to 100 weight percent of the low Tg monomer, 0 to 30 weight percent polar monomer, 0 to 50 weight percent high Tg monomer, and 0 to 15 weight percent vinyl monomers not having a (meth)acryloyl group. In still other embodiments, the first monomer composition contains 60 to 100 weight percent of the low Tg monomer, 0 to 20 weight percent polar monomer, 0 to 40 weight percent high Tg monomer, and 0 to 10 weight percent vinyl monomers not having a (meth)acryloyl group. In yet other embodiments, the first monomer composition contains 75 to 100 weight percent of the low Tg monomer, 0 to 10 weight percent polar monomer, 0 to 25 weight percent high Tg monomer, and 0 to 5 weight percent vinyl monomers not having a (meth) acryloyl group.

The resulting elastomeric polymeric material of Formula (II-1) contains up to 100 weight percent or 100 weight percent low Tg monomer units. The weight percent value is based on the total weight of monomeric units in the polymeric material. In some embodiments, the polymeric material contains 40 to 100 weight percent of the low Tg monomeric units, 0 to 15 weight percent polar monomeric units, 0 to 50 weight percent high Tg monomeric units, and 0 to 15 weight percent vinyl monomeric units. In still other embodiments, the polymer contains 60 to 100 weight percent of the low Tg monomeric units, 0 to 10 weight percent polar monomeric units, 0 to 40 weight percent high Tg monomeric units, and 0 to 10 weight percent vinyl monomeric units. In yet other embodiments, the polymer contains 75 to 100 weight percent of the low Tg monomeric units, 0 to 10 weight percent polar monomeric units, 0 to 25 weight percent high Tg monomeric units, and 0 to 5 weight percent monomeric units.

The weight average molecular weight of the elastomeric polymeric material of Formula (II-1) is often in a range of 10,000 Da to 1,000,000 Da or even higher. For example, the weight average molecular weight can be at least 20,000 Da, at least 30,000 Da, at least 40,000 Da, or at least 50,000 and can be up to 1,000,000 Da, up to 900,000 Da, up to 800,000 Da, up to 700,000 Da, or up to 600,000 Da.

The elastomeric material of Formula (II-1) can be a fully polymerized polymeric material (e.g., the outer blocks are greater than 99 weight percent polymerized based on the weight of monomers used to form polymer block $P_1$), a nearly fully polymerized (e.g., the outer blocks are at least 80 to 99 weight percent polymerized polymeric material based on the weight of the monomers used to form polymer block $P_1$), or are partially polymerized (e.g., 5 to 80 weight percent polymerized polymeric material based on the weight of the monomers used to form polymer block $P_1$). The partially polymerized polymeric materials are syrup polymers.

Using a syrup polymer rather than a fully or nearly fully polymerized polymeric material can be advantageous in some embodiments. The photoinitiators of Formula (I) allow the formation of syrup polymers that include polymeric chains with a narrower distribution of molecular weights compared to conventionally prepared syrup polymers. These conventionally prepared syrup polymers often contain a small number of longer chains resulting in syrups with higher viscosities. That is, the viscosity of the syrup polymer can be more easily controlled and adjusted with polymeric materials formed using the photoinitiators of Formula (I).

The elastomeric material of Formula (II-1) is combined with a second monomer composition containing a crosslinking monomer having at least two ethylenically unsaturated groups. In some embodiments, the only monomer in the second monomer composition is the crosslinking monomer. In other embodiments, the second monomer composition further includes a monomer having a single ethylenically unsaturated group. The single ethylenically unsaturated monomer can be a residual monomer remaining in the syrup polymer or can be additional monomers that were not included in the monomer composition used to form the elastomeric material of Formula (II-1). Examples of additional monomers are any of those described above.

In addition to the polymeric material of Formula (II) (including elastomeric material of Formula (II-1)) and the various monomers, the crosslinkable composition can optionally further include a photoinitiator. The initiator can be a photoinitiator of Formula (I), a photoinitiator not of Formula (I) such as a conventionally used photoinitiator for free radical polymerization reactions, or mixtures thereof. Suitable photoinitiator compounds that are not of Formula (I) include, for example, benzoin ethers (e.g., benzoin methyl ether or benzoin isopropyl ether) or substituted benzoin ethers (e.g., anisoin ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl) oxime. Other suitable photoinitiators include, for example, 1-hydroxycyclohexyl phenyl ketone (commercially available under the trade designation IRGACURE 184), bis(acyl) phenyl phosphine oxides such as bis(2,4,6-trimethylbenzoyl)phenyl phosphine oxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio) phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA). In some embodiments, the photoinitiator is a substituted acetophenone or a bis(acyl)phenyl phosphine oxide.

The amount of any added photoinitiator is often in a range of 0 to 1 weight percent based on a total weight of polymerized and polymerizable material. For example, the amount can be at least 0.01 weight percent, at least 0.02 weight percent, at least 0.05 weight percent, or at least 0.1 weight percent and can be up to 1 weight percent, up to 0.8 weight percent, up to 0.5 weight percent, or up to 0.3 weight percent.

An organic solvent can be added, if desired, to control the viscosity of the crosslinkable composition. In many embodiments, no organic solvent (i.e., the curable composition is free of organic solvent) or only a minimum amount of the organic solvent is added. The amount of organic solvent can be up to 60 weight percent or even higher based on a total weight of the crosslinkable composition. The amount of organic solvent can be up to 50 weight percent, up to 40 weight percent, up to 30 weight percent, up to 20 weight percent, up to 10 weight percent, or up to 5 weight percent.

In some embodiments, it is desirable to keep the content of organic solvent as low as possible. Any organic solvent used in the second reaction mixture is typically removed at the completion of the crosslinking reaction. Suitable organic solvents include, but are not limited to, methanol, tetrahydrofuran, ethanol, isopropanol, heptane, acetone, methyl ethyl ketone, methyl acetate, ethyl acetate, toluene, xylene, and ethylene glycol alkyl ether. Those solvents can be used alone or as mixtures thereof.

To form a crosslinked composition, the crosslinkable composition is often applied as a layer to a substrate and then exposed to actinic radiation (e.g., ultraviolet radiation). Any suitable substrate can be used. Stated differently, an article is provided that includes a first substrate and a crosslinkable composition layer positioned adjacent the first substrate. Any of the crosslinkable composition described above can be used in the crosslinkable composition layer.

The crosslinkable composition layer can be positioned adjacent to the substrate using any suitable process such as, for example, flow coating, dip coating, spray coating, knife coating, die coating, or extrusion. Once positioned adjacent to the substrate, the crosslinkable coating layer is exposed to actinic radiation (e.g., ultraviolet radiation) to react the second monomer composition and form the crosslinkable composition.

The use of polymeric material of Formula (II) in the crosslinkable composition is particularly advantageous due to its active end groups (terminal groups). As with the formation of each block of the polymeric material of Formula (II), upon exposure of the crosslinkable composition to actinic radiation (e.g., ultraviolet radiation), photolysis occurs releasing the radical of formula $R_3$—(CS)—S*. Monomers in the crosslinkable composition can polymerize to form crosslinked polymeric block attached to each of the outer blocks in the polymeric material of Formula (II). The product is a crosslinked polymeric material.

If polymeric materials are formed using conventional methods and lack active terminal groups (such as $R_3$—(CS)—S— groups in the polymeric materials of Formula (II)) are combined with a crosslinking monomer having multiple ethylenically unsaturated groups, a second polymeric material forms that is separate from the original polymeric material. The second polymeric material is crosslinked in the presence of the original polymeric material and the result is the formation of a gelled network. The original polymeric material is not involved in the crosslinking reaction and usually is not covalently attached to the second polymeric material in the gelled network.

In contrast, the polymeric material of Formula (II) has terminal $R_3$—(CS)—S— groups. When exposed to actinic radiation (e.g., ultraviolet radiation), radicals of formula $R_3$—(CS)—S* are released and the original polymeric material undergoes chain extension and crosslinking reactions. There is no additional second polymeric material formed that is separate from the original polymeric material. That is, the original polymeric material itself is involved in the crosslinking reaction.

The crosslinkable composition can be exposed to actinic radiation (e.g., ultraviolet radiation) having a UVA maximum in a range of 280 to 425 nanometers. Ultraviolet light sources can be of various types. Low light intensity lights such as black lights, generally provide intensities ranging from 0.1 or 0.5 mW/cm$^2$ (milliWatts per square centimeter) to 10 mW/cm$^2$ (as measured in accordance with procedures approved by the United States National Institute of Standards and Technology as, for example, with a UVIMAP UM 365 L-S radiometer manufactured by Electronic Instrumentation & Technology, Inc., in Sterling, Va.). High light intensity sources generally provide intensities greater than 10, 15, or 20 mW/cm$^2$ ranging up to 450 mW/cm$^2$ or greater. In some embodiments, high intensity light sources provide intensities up to 500, 600, 700, 800, 900 or 1000 mW/cm$^2$. UV light to polymerize the monomer component(s) can be provided by various light sources such as light emitting diodes (LEDs), black lights, medium pressure mercury lamps, etc. or a combination thereof. The monomer component(s) can also be polymerized with higher intensity light sources as available from Fusion UV Systems Inc. The UV exposure time for polymerization and curing can vary depending on the intensity of the light source(s) used. For example, complete curing with a low intensity light course can be accomplished with an exposure time ranging from about 30 to 300 seconds; whereas complete curing with a high intensity light source can be accomplished with shorter exposure time ranging from about 5 to 20 seconds. Partial curing with a high intensity light source can typically be accomplished with exposure times ranging from about 2 seconds to about 5 or 10 seconds.

In some embodiments, it is preferable to use lights that emit a narrow spectrum of light in the ultraviolet region of the electromagnetic spectrum. These light sources, which can include LEDs and lasers, can result in the formation of crosslinkable compositions without the need to add conventional photoinitiators prior to the curing process. These light sources can enhance the rate of polymerization while maintaining the reactive nature of the polymeric material.

In other embodiments, where broader wavelength ultraviolet light sources are used such as black lights, conventional photoinitiators may need to be added to the crosslinkable compositions prior to crosslinking.

Either the polymeric material of Formula (II) or a crosslinkable composition that contains the polymeric material of Formula (II) can be positioned on any suitable substrate to provide an article. The substrate can be flexible or inflexible and can be formed from a polymeric material, glass or ceramic material, metal, or combination thereof. Some substrates are polymeric films such as those prepared from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl(meth)acrylates (PMMA), ethylene-vinyl acetate copolymers, and cellulosic materials (e.g., cellulose acetate, cellulose triacetate, and ethyl cellulose). Other substrates are metal foils, nonwoven materials (e.g., paper, cloth, nonwoven scrims), foams (e.g., polyacrylic, polyethylene, polyurethane, neoprene), and the like. For some substrates, it may be desirable to treat the surface to improve adhesion to the polymeric material and/or to the crosslinkable composition and/or to the crosslinked composition. Such treatments include, for example, application of primer layers, surface modification layer (e.g., corona treatment or surface abrasion), or both.

In some embodiments, the substrate is a release liner. Release liners typically have low affinity for the polymeric material, crosslinkable composition, and crosslinked composition. Exemplary release liners can be prepared from paper (e.g., Kraft paper) or other types of polymeric material. Some release liners are coated with an outer layer of a release agent such as a silicone-containing material or a fluorocarbon-containing material.

The polymeric material or the crosslinkable composition can be positioned next to a substrate using a roll-to-roll process. That is, the substrate can be moved from a first roll to a second roll in a continuous process. As the substrate moves between the first roll and the second roll, it can be coated with the polymeric material or with the crosslinkable composition. Such a substrate can be regarded as being a web and the web is often a polymeric material such as those described above. The polymeric web can be unrolled from a first roll, coated with the crosslinkable composition, exposed to actinic radiation (e.g., ultraviolet radiation) for crosslinking, and then rolled onto the second roll.

The polymeric material or the crosslinkable composition coating can have any desired thickness. The thickness of the crosslinkable composition coating is typically selected so that it can be effectively crosslinked when exposed to actinic radiation (e.g., ultraviolet radiation). In many embodiments, the crosslinkable composition coating has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness is often at least 0.5 mils (12.5 micrometers) or at least 1 mil (25 micrometers). For example, the thickness of the crosslinkable composition coating can be in the range of 0.5 mils (2.5 micrometers) to 20 mils (500 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

In some embodiments, the crosslinked composition is a pressure-sensitive adhesive. Thus, articles with a layer of the crosslinked composition have a pressure-sensitive adhesive layer and can be used for many applications typical of such articles. The substrate adjacent to the pressure-sensitive layer can be selected depending on the particular application. For example, the substrate can be a sheeting material and the resulting article can provide decorative graphics or can be a reflective product. In other examples, the substrate can be label stock (the resulting article is a label with an adhesive layer), a tape backing (the resulting article is an adhesive tape), or a foam. In yet other examples, the substrate can be a release liner and the resulting article can be a transfer tape. The transfer tape can be used to transfer the pressure-sensitive adhesive layer to another substrate or surface. Other substrates and surface include, for example, a panel (e.g., a metal panel such as an automotive panel) or a glass window.

Some articles are adhesive tapes. The adhesive tapes can be single-sided adhesive tapes with the crosslinkable composition attached to a single side of the tape backing or can be double-sided adhesive tape with a pressure-sensitive adhesive layer on both major surfaces of the tape backing. At least one of the two pressure-sensitive adhesive layers is the crosslinkable composition described above. Double-sided adhesive tapes are often carried on a release liner.

If desired, tackifiers can be added to the crosslinkable composition used to form pressure-sensitive adhesives compositions. Suitable tackifying resins include rosin resins such as rosin acids and their derivatives (e.g., rosin esters); terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the pressure-sensitive adhesive composition. Combinations of various tackifiers can be used, if desired.

Various embodiments are provided that are reaction mixtures, polymeric materials, crosslinkable compositions, crosslinked compositions, articles containing the polymeric materials, articles containing the crosslinkable compositions or the crosslinked compositions, methods of making articles, and photoinitiators are provided.

Embodiment 1A is a first reaction mixture. The first reaction mixture includes a) a photoinitiator of Formula (I)

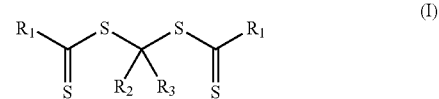

and b) a monomer composition 1A containing at least one monomer having a single ethylenically unsaturated group. In Formula (I), each group $R_1$ is an alkoxy, aryloxy, alkenoxy, or $-N(R_4)_2$. The group $R_2$ is of formula $-(OR)-OR_6$. Group $R_3$ is a hydrogen, alkyl, aryl, aralkyl, alkaryl, a group of formula $-(CO)OR_7$, or a group of formula $-(CO)N(R_8)_2$. Each $R_4$ in the group $-N(R_4)_2$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R_5$ is an alkylene and $R_6$ is an alkyl. $R_7$ and each $R_8$ are independently an alkyl, aryl, aralkyl, or alkaryl. The variable x is an integer equal to at least 0.

Embodiment 2A is the first reaction mixture of embodiment 1A, wherein the photoinitiator of Formula (I) is of Formula (I-1).

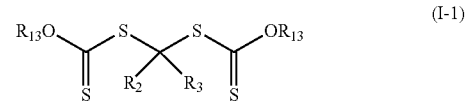

In Formula (I-1), group $R_{13}$ is an alkyl (the group $-OR_{13}$ is an alkoxy).

Embodiment 3A is the first reaction mixture of embodiment 1A, wherein the photoinitiator of Formula (I) is of Formula (I-2).

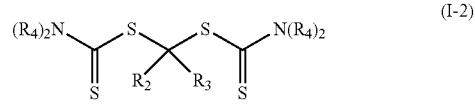

Embodiment 4A is the first reaction mixture of embodiment 1A, wherein the photoinitiator of Formula (I) is of Formula (I-3).

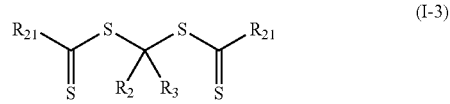

In Formula (I-3), $R_{21}$ is an aryloxy, alkenoxy, or $-N(R_4)_2$.

Embodiment 5A is the first reaction mixture of embodiment 1A, wherein the photoinitiator of Formula (I) is of Formula (I-4).

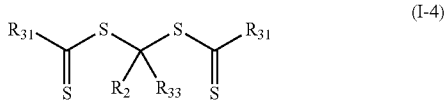

(I-4)

In Formula (I-4), $R_{31}$ is an alkoxy. Group $R_{33}$ is an alkyl, aralkyl, alkaryl, a group of formula $-(CO)OR_7$, or a group of formula $-(CO)N(R_8)_2$.

Embodiment 6A is the first reaction mixture of any one of embodiments 1A to 5A, wherein the monomer composition 1A comprises 50 to 100 weight percent of a first monomer with a single (meth)acryloyl group and 0 to 50 weight percent of a second monomer having a single ethylenically unsaturated group that is not a (meth)acryloyl group. The weight percent is based on the total weight of monomers in the monomer composition 1A.

Embodiment 7A is the first reaction mixture of embodiment 6A, wherein the monomer composition 1A comprises 80 to 100 weight percent of the first monomer and 0 to 20 weight percent of the second monomer.

Embodiment 8A is the first reaction mixture of any one of embodiments 1A to 7A, wherein the first reaction mixture is free of a monomer having more than one ethylenically unsaturated groups.

Embodiment 1B is a second reaction mixture. The second reaction mixture includes a) a polymeric material of Formula (II-1)

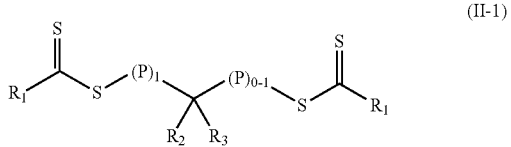

(II-1)

and b) monomer composition 1B comprising at least one monomer having a single ethylenically unsaturated group, wherein the monomer composition 1B is different than a monomer composition 1A used to form a polymeric material of Formula (II-1). In Formula (II-1), each group $R_1$ is an alkoxy, aryloxy, alkenoxy, or $-N(R_4)_2$. The group $R_2$ is of formula $-(OR_8)_x-OR_6$. Group $R_3$ is a hydrogen, alkyl, aryl, aralkyl, alkaryl, a group of formula $-(CO)OR_7$, or a group of formula $-(CO)N(R_8)_2$. Each $R_4$ in the group $-N(R_4)_2$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R_5$ is an alkylene and $R_6$ is an alkyl. $R_7$ and each $R_8$ are independently an alkyl, aryl, aralkyl, or alkaryl. The variable x is an integer equal to at least 0. $(P)_1$ means that there is one polymeric block and $(P)_{0-1}$ means that there are 0 to 1 polymeric blocks.

Embodiment 2B is the second reaction mixture of embodiment 1B, wherein the monomer composition 1B comprises 50 to 100 weight percent of a first monomer with a single (meth)acryloyl group and 0 to 50 weight percent of a second monomer having a single ethylenically unsaturated group that is not a (meth)acryloyl group. The weight percent is based on the total weight of monomers in the monomer composition 1B.

Embodiment 3B is the second reaction mixture of embodiment 2B, wherein the monomer composition 1B comprises 80 to 100 weight percent of the first monomer and 0 to 20 weight percent of the second monomer.

Embodiment 4B is the second reaction mixture of any one of embodiments 1B to 3B, wherein the second reaction mixture is free of a monomer having more than one ethylenically unsaturated groups.

Embodiment 1C is a third reaction mixture. The third reaction mixture includes a) a polymeric material of Formula (II-2)

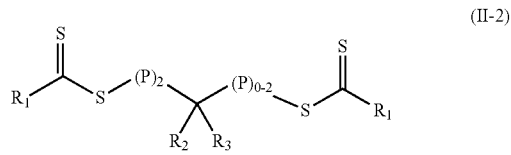

(II-2)

and b) a monomer composition 1C comprising at least one monomer having a single ethylenically unsaturated group, wherein the monomer composition 1C is different than a monomer composition 1B used to form a second polymeric block (an outer polymeric block, which is the block closest to the $-S-(CS)-R_1$ group) of a polymeric material of Formula (II-2). In Formula (II-2), each group $R_1$ is an alkoxy, aryloxy, alkenoxy, or $-N(R_4)_2$. The group $R_2$ is of formula $-(OR_8)_x-OR_6$. Group $R_3$ is a hydrogen, alkyl, aryl, aralkyl, alkaryl, a group of formula $-(CO)OR_7$, or a group of formula $-(CO)N(R_8)_2$. Each $R_4$ in the group $-N(R_4)_2$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R_5$ is an alkylene and $R_6$ is an alkyl. $R_7$ and each $R_8$ are independently an alkyl, aryl, aralkyl, or alkaryl. The variable x is an integer equal to at least 0. $(P)_2$ means that there are 2 polymeric blocks and $(P)_{0-2}$ means that there are 0 to 2 polymeric blocks.

Embodiment 2C is the third reaction mixture of embodiment 1C, wherein the monomer composition 1C comprises 50 to 100 weight percent of a first monomer with a single (meth)acryloyl group and 0 to 50 weight percent of a second monomer having a single ethylenically unsaturated group that is not a (meth)acryloyl group. The weight percent is based on the total weight of monomers in the monomer composition 1C.

Embodiment 3C is the third reaction mixture of embodiment 2C, wherein the monomer composition 1C comprises 80 to 100 weight percent of the first monomer and 0 to 20 weight percent of the second monomer.

Embodiment 4C is the third reaction mixture of any one of embodiments 1C to 3C, wherein the third reaction mixture is free of a monomer having more than one ethylenically unsaturated groups.

Embodiment 1D is a polymeric material of Formula (II).

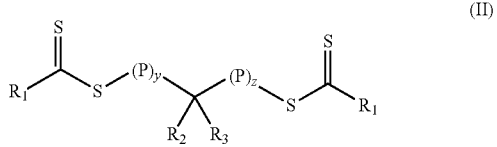

In Formula (II), each group $R_1$ is an alkoxy, aryloxy, alkenoxy, or —$N(R_4)_2$. The group $R_2$ is of formula —$(OR_5)_x$—$OR_6$. Group $R_3$ is a hydrogen, alkyl, aryl, aralkyl, alkaryl, a group of formula —$(CO)OR_7$, or a group of formula —$(CO)N(R_8)_2$. Each $R_4$ in the group —$N(R_4)_2$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more one or more second rings that are carbocyclic or heterocyclic. Each $R_5$ is an alkylene and $R_6$ is an alkyl. $R_7$ and each $R_8$ are independently an alkyl, aryl, aralkyl, or alkaryl. Each P is a polymeric block that comprises a polymerized product of a first monomer composition comprising at least one monomer having a single ethylenically unsaturated group. The variable x is an integer equal to at least 0, the variable y is an integer in a range of 1 to 10, and the variable z is an integer in a range of 0 to y. $(P)_y$ means that there are y polymeric blocks and $(P)_z$ means that there are 0 to y polymeric blocks.

Embodiment 2D is the polymeric material of embodiment 1D, wherein the polymeric material of Formula (II) is of Formula (II-a).

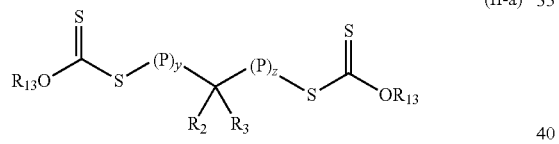

In Formula (II-a), group $R_{13}$ is an alkyl.

Embodiment 3D is the polymeric material of embodiment 1D, wherein the polymeric material of Formula (II) is of Formula (II-b).

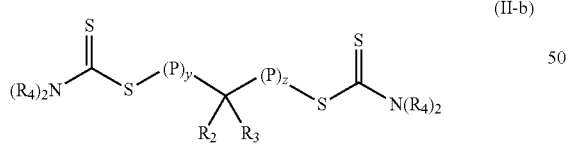

Embodiment 4D is the polymeric material of embodiment 1D, wherein the polymeric material of Formula (II) is of Formula (II-c).

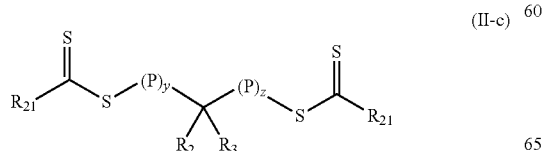

In Formula (II-c), group $R_{21}$ is an aryloxy, alkenoxy, or —$N(R_4)_2$.

Embodiment 5D is the polymeric material of embodiment 1D, wherein the polymeric material of Formula (II) is of Formula (II-d).

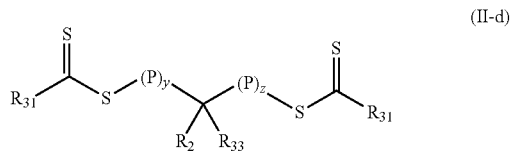

In Formula (II-d), group $R_{31}$ is an alkoxy. Group $R_{33}$ is an alkyl, aralkyl, alkaryl, a group of formula —$(CO)OR_7$, or a group of formula —$(CO)N(R_8)_2$.

Embodiment 6D is the polymeric material of embodiment 1D, wherein the polymeric material is of Formula (II-1) where y is 1 and z is in a range of 0 to 1.

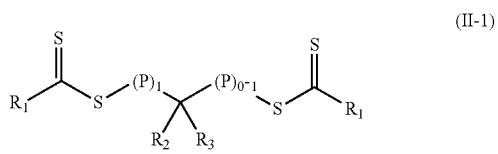

Embodiment 7D is the polymeric material of embodiment 6D, wherein the polymeric material is of Formula (II-1-1), Formula (II-1-2), or a mixture thereof.

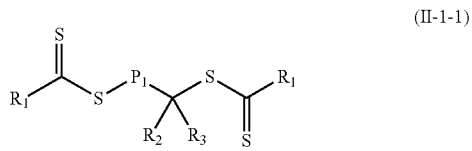

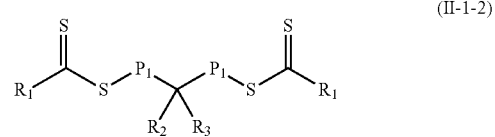

Embodiment 8D is the polymeric material of embodiment 1D, wherein the polymeric material of Formula (II-2) where y is 2 and z is in a range of 0 to 2.

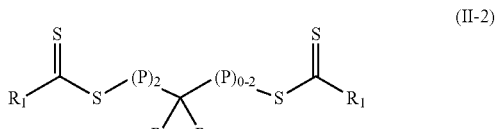

Embodiment 9D is the polymeric material of embodiment 8D, wherein the polymeric material is of Formula (II-2-1), Formula (II-2-2), or a mixture thereof.

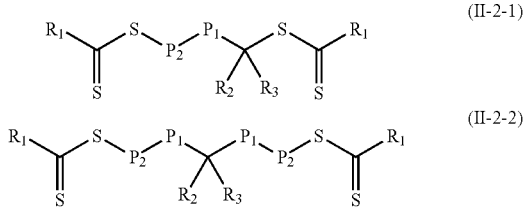

$P_1$ is a first polymeric block and $P_2$ is a second polymeric block.

Embodiment 10D is the polymeric material of embodiment 1D, wherein the polymeric material is of Formula (II-3) where y is 3 and z is in a range of 0 to 3.

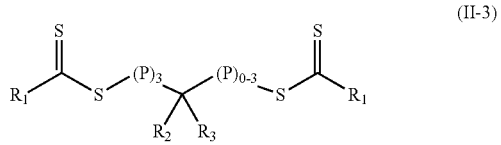

Embodiment 11D is the polymeric material of any one of embodiments 1D to 10D, wherein $R_3$ is —(CO)$OR_7$.

Embodiment 1E is a crosslinkable composition that contains a) a polymeric material of Formula (II)

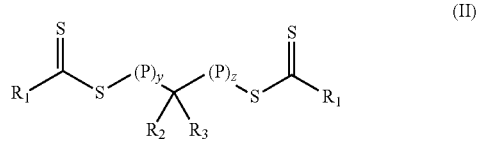

and b) a second monomer composition comprising a crosslinking monomer having at least two ethylenically unsaturated groups. In Formula (II), each group $R_1$ is an alkoxy, aryloxy, alkenoxy, or —N$(R_4)_2$. The group $R_2$ is of formula —(O$R_5)_x$—O$R_6$. Group $R_3$ is a hydrogen, alkyl, aryl, aralkyl, alkaryl, a group of formula —(CO)$OR_7$, or a group of formula —(CO)N$(R_8)_2$. Each $R_4$ in the group —N$(R_4)_2$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R_5$ is an alkylene and $R_6$ is an alkyl. $R_7$ and each $R_8$ are independently an alkyl, aryl, aralkyl, or alkaryl. Each P is a polymeric block that comprises a polymerized product of a first monomer composition comprising at least one monomer having a single ethylenically unsaturated group. The variable x is an integer equal to at least 0, the variable y is an integer in a range of 1 to 10, and the variable z is an integer in a range of 0 to y.

Embodiment 2E is the crosslinkable composition of embodiment 1E, wherein the polymeric material is according to any one of embodiment 2D to 11D.

Embodiment 3E is the crosslinkable composition of embodiment 1E or 2E, wherein the polymeric material of Formula (II) (such as Formula (II-1)) is an elastomeric material.

Embodiment 4E is the crosslinkable composition of any one of embodiments 1E to 3E, wherein the second monomer composition further comprises a monomer having a single ethylenically unsaturated group.

Embodiment 5E is the crosslinkable composition of any one of embodiments 1E to 4E, wherein the crosslinkable composition comprises 1) 5 to 99.99 weight percent polymeric material of Formula (II) and 2) a second monomer composition comprising a) 0.01 to 20 weight percent crosslinking monomer having at least two ethylenically unsaturated groups, and b) 0 to 95 weight percent monomer having a single ethylenically unsaturated group, wherein each amount is based on a total weight of polymerized and polymerizable material.

Embodiment 6E is the crosslinkable composition of any one of embodiments 1E to 5E, wherein the crosslinkable composition comprises 1) 10 to 60 weight percent polymeric material of Formula (II) and 2) a second monomer composition comprising a) 0.01 to 10 weight percent crosslinking monomer having at least two ethylenically unsaturated groups, and b) 30 to 90 weight percent monomer having a single ethylenically unsaturated group, wherein each amount is based on a total weight of polymerized and polymerizable material.

Embodiment 7E is the crosslinkable composition of any one of embodiments 1E to 6E, wherein the crosslinkable composition comprises 1) 10 to 40 weight percent polymeric material of Formula (II) and 2) a second monomer composition comprising a) 0.01 to 5 weight percent crosslinking monomer having at least two ethylenically unsaturated groups, and b) 55 to 90 weight percent monomer having a single ethylenically unsaturated group, wherein each amount is based on a total weight of polymerized and polymerizable material.

Embodiment 8E is the crosslinkable composition of any one of embodiments 2E to 7E, wherein the polymeric material of Formula (II) comprises 40 to 100 weight percent of a low Tg monomeric unit, 0 to 15 weight percent of a polar monomeric unit, 0 to 50 weight percent of a high Tg monomeric unit, and 0 to 15 weight percent vinyl monomeric units based on a total weight of monomeric units.

Embodiment 9E is the crosslinkable composition of any one of embodiments 1E to 8E, wherein the polymeric material of Formula (II) has a weight average molecular weight in a range of 10,000 Daltons to 5 million Daltons.

Embodiment 10E is the crosslinkable composition of any one of embodiments 1E to 9E, wherein the crosslinkable composition further comprises a photoinitiator.

Embodiment 11E is the crosslinkable composition of embodiment 10E, wherein the photoinitiator is of Formula (I).

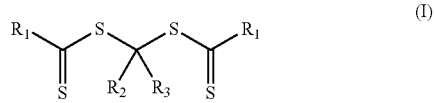

Embodiment 12E is the crosslinkable composition of embodiment 10E, wherein the photoinitiator is not of Formula (I).

Embodiment 13E is the crosslinkable composition of any one of embodiments 1E to 12E, wherein the crosslinkable composition further comprises a tackifier.

Embodiment 1F is a crosslinked composition that includes a cured product of a crosslinkable composition. The crosslinkable composition is according to embodiment 1E.

Embodiment 2F is the crosslinked composition of embodiment 1F, wherein the crosslinkable composition is according to any one of embodiments 2E to 13E.

Embodiment 3F is the crosslinked composition of embodiment 1F or 2F, wherein the crosslinked composition is a pressure-sensitive adhesive.

Embodiment 1G is an article that includes a first substrate and a crosslinkable composition layer adjacent to the substrate, wherein the crosslinkable composition is of embodiments 1E.

Embodiment 2G is the article of embodiment 1G, wherein the crosslinkable composition is according to any one of embodiments 2E to 13E.

Embodiment 1H is an article that includes a first substrate and a crosslinked composition layer adjacent to the substrate, wherein the crosslinked composition layer includes a cured product of a crosslinkable composition of embodiment 1E.

Embodiment 2H is the article of embodiment 1H, wherein the crosslinkable composition is according to any one of embodiments 2E to 13E.

Embodiment 1I is a method of making an article. The method includes providing a first substrate and applying a layer of a crosslinkable composition adjacent to the first substrate. The crosslinkable composition is of any one of embodiments 1E to 13E. The method further includes exposing the layer of crosslinkable composition to actinic radiation to form a layer of crosslinked composition. The actinic radiation includes actinic radiation.

Embodiment 2I is the method of embodiment 1I, wherein the substrate is in the form of a polymeric web.

Embodiment 3I is the method of embodiment 1I or 2I, wherein the actinic radiation is from a light emitting diode.

Embodiment 1J is an article that includes a first substrate and a layer containing the polymeric material of Formula (II) as described in any one of embodiments 1D to 11D.

Embodiment 1K is a method of making a polymeric material. The method includes providing a photoinitiator of Formula (I).

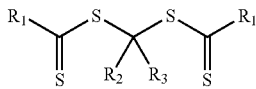

In Formula (I), each $R_1$ is an alkoxy, aryloxy, alkenoxy, or $-N(R_4)_2$. Group $R_2$ is of formula $-(OR_5)_x-OR_6$. Group $R_3$ is a hydrogen, alkyl, aryl, a group of formula $-(CO)OR_7$, or a group of formula $-(CO)N(R_8)_2$. Each $R_4$ is an alkyl or alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R_5$ is an alkylene. Group $R_6$ is an alkyl. Group $R_7$ is an alkyl or aryl. Each $R_8$ is an alkyl or aryl. The variable x is an integer equal to at least 0. The method further includes preparing a first reaction mixture comprising the photoinitiator of Formula (I) and a first monomer composition comprising at least one monomer having a single ethylenically unsaturated group. The method still further includes forming a first polymeric material of Formula (II-1) from the first reaction mixture.

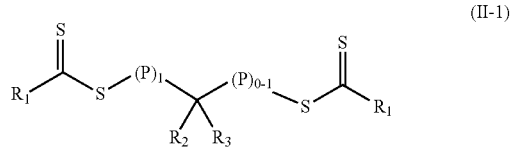

$(P)_1$ means that there is one polymeric block and $(P)_{0-1}$ means that there are zero or one polymeric blocks. Each polymeric block being a polymerized product of a first monomer composition.

Embodiment 1L is a compound of Formula (I-3).

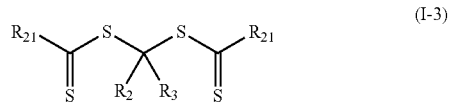

In Formula (I-3), group $R_{21}$ is an aryloxy, alkenoxy, or $-N(R_4)_2$. The group $R_2$ is of formula $-(OR_5)_x-OR_6$. Group $R_3$ is a hydrogen, alkyl, aryl, aralkyl, alkaryl, a group of formula $-(CO)OR_7$, or a group of formula $-(CO)N(R_8)_2$. Each $R_4$ in the group $-N(R_4)_2$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. $R_5$ is an alkylene and $R_6$ is an alkyl. $R_7$ and each $R_8$ are independently an alkyl, aryl, aralkyl, or alkaryl. The variable x is an integer equal to at least 0.

Embodiment 1M is a compound of Formula (I-4).

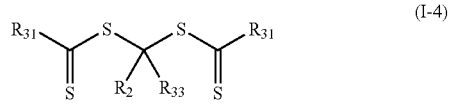

In Formula (I-4), group $R_{31}$ is an alkoxy. The group $R_2$ is of formula $-(OR_5)_x-OR_6$. Group $R_{33}$ is an alkyl, aralkyl, alkaryl, a group of formula $-(CO)OR_7$, or a group of formula $-(CO)N(R_8)_2$. $R_5$ is an alkylene and $R_6$ is an alkyl. $R_7$ and each $R_8$ are independently an alkyl, aryl, aralkyl, or alkaryl. The variable x is an integer equal to at least 0.

EXAMPLES

Test Methods
Peel Adhesion Strength

Stainless steel (SS) panels were cleaned by wiping them three times using methyl ethyl ketone and a clean lint-free tissue. The cleaned panels were allowed to dry at room temperature. Tape samples measuring 0.5 inch (1.27 centimeters) wide and 8 inches (20.3 centimeters) long were cut, then centered on the cleaned panels and adhered to one end such that tape overlapped the panel by 25.4 millimeters (1 inch) in the lengthwise direction. The tape sample was then rolled down one time in each direction using a 4.5 pound (ca. 2 kilograms) rubber roller. After conditioning for 15 minutes at 23° C. (73° F.) and 50% relative humidity (RH), the peel adhesion strength was measured, under the same temperature and relative humidity as used above, at an angle of 180 degrees and a rate of 305 millimeters/minute (12 inches/minute) using a peel adhesion tester (IMASS Slip/Peel Tester, Model SP-2000, available from IMASS Incorporated, Accord, Mass.). Four samples were evaluated, the results normalized to ounces/inch (oz/in) and the average value calculated. The results were reported in both ounces/inch (oz/in) and Newtons/decimeter (N/dm).

Shear Strength—Elevated Temperature

Stainless steel (SS) panels were cleaned by wiping them three times using methyl ethyl ketone and a clean lint-free tissue. Tape samples measuring 0.5 inch (1.27 centimeters) wide and between 3 and 4 inches (7.6 and 10.2 centimeters) long were cut, then centered on the cleaned panels and adhered to one end such that tape overlapped the panel by 25.4 millimeters (1 inch) in the lengthwise direction. The tape sample was then rolled down one time in each direction using a 4.5 pound (ca. 2 kilograms) rubber roller. After conditioning the tape/test panel assembly for 15 minutes at 23° C. (73° F.) it was suspended in a stand in an oven heated to 158° F. (70° C.) and tilted at an angle of 2° from vertical to ensure a shear force. A 500 gram weight was hung from the free end of the tape sample. The time, in minutes, for the tape to fall from the panel was recorded. The test was terminated if failure had not occurred in 10,000 minutes and the result recorded as "10,000+". One test sample was run for each tape construction.

Molecular Weight by Gel Permeation Chromatography (GPC)

Molecular weights and polydispersity were determined at 23° C. by gel permeation chromatography (GPC) using a Waters LC SYSTEM (Waters Corporation, Milford, Mass.) equipped with a Waters Styragel HR 5E THF 300 millimeter (length)×7.8 millimeter I.D. (Inside Diameter) column, in combination with a Waters 2414 REFRACTIVE INDEX DETECTOR. Sample solutions were prepared by mixing 10 milliliters of tetrahydrofuran (THF) to a sample weighing between approximately 50 and 100 milligrams, and mixing for at least 1 hour followed by filtering through a 0.2 micrometer polytetrafluoroethylene syringe filter. The injection volume was 20 microliters and the THF eluent flow rate was 1.0 milliliter/minute. Weight and Number Average Molecular Weights ($M_w$ and $M_n$, g/mole) and polydispersity index, PDI ($M_w/M_n$) were determined relative to a calibration curve with polystyrene standards.

NMR Analysis

Approximately 50-100 milligrams of the polymer reaction was dissolved in approximately 1 mL of deuterated chloroform and NMR spectra were acquired on a Bruker AVANCE III 500 MHz spectrometer equipped with a broadband cryoprobe. Spectra were acquired with a low tip angle (150) and a relaxation delay of 4 seconds for good quantitation. Two dimensional (2D) NMR experiments (gCOSY, TOCSY, gHSQC, and gHMBC) were run to assign the free initiator and different polymer end groups. As the reaction progressed, two different types of polymeric chains were observed as depicted in the schematic below.

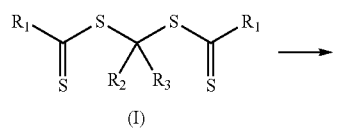

(I)

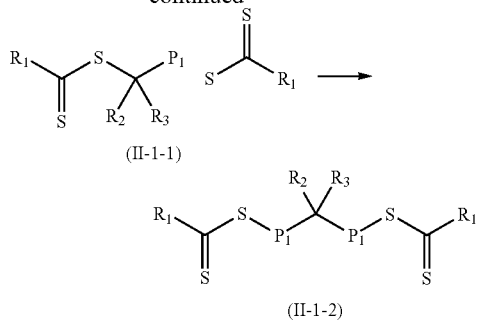

Peak assignments for the different polymeric chains are given in the examples section for each unique initiator. The peak assignments were confirmed from a 2D gHMBC experiment, which provides the highest level of structural detail. As used herein, the term "mono-directional" refers to polymeric chains where a single radical group of formula $R_1$—(CS)—S* has been cleaved to initiate polymeric chain growth in a single direction (Formula (II-1-1) in schematic above). As used herein, the term "bi-directional" refers to polymeric chains where two radical groups of formula $R_3$—(CS)—S* have been cleaved to initiate polymeric chain growth in two directions (Formula (II-1-2) in schematic above) and the initiator fragment —C($R_2$)$R_3$— is left in the middle of the polymer chain.

A variety of parameters were determined from the integrals in the $^1$H NMR spectra, including percent conversion, the number average molecular weight ($M_n$) of the polymeric material, the mole fraction of free initiator remaining, and the mole fraction of polymeric chains that are mono-directional (Formula (II-1-1)). Percent conversion was calculated as the moles of polymer repeat units (integral of resonance at 4.03 ppm divided by 2 for poly(BA) or integral resonance at 3.94 divided by 2 for poly(2EHA)) divided by the sum of moles of polymer repeat units and moles of unreacted monomer (integral of resonance at 6.40 ppm). The degree of polymerization (DP) was determined from the moles of polymer repeat unit divided by the moles of polymer chains. According to the scheme above, there is one mono-directional or one bi-directional ether group per polymer chain. Therefore, the moles of polymer chains are equal to the moles of the mono-directional resonance plus the moles of the bi-directional resonance (defined below in Examples 8-10). From the calculated DP, the Mn is calculated as DP* 128.17 for poly(BA) (the molecular weight of a BA repeat unit is 128.17 grams/mole) or DP* 184.3 for poly(2EHA) (the molecular weight of a 2EHA repeat unit is 184.3 grams/mole). The mole fraction of free initiator remaining was calculated from the moles of free initiator divided by the moles of total initiator species (moles free initiator plus moles mono-directional and bi-directional polymer chains). The mole fraction of mono-directional polymeric chains was calculated by dividing the integral of mono-directional polymeric chains by the total polymeric chains (mono-directional and bi-directional).

Preparatory Examples

Preparation of Sodium Isopropyl Xanthate (SIX)

Isopropanol, 871.1 grams (14.49 moles), in a flask equipped with a mechanical stirrer, was purged with nitrogen. Sodium metal cubes (20.25 grams, 0.88 moles, Sigma-Aldrich, St. Louis, Mo.) were cut into small pieces and added to the flask over a period of three hours. The temperature was then increased to 65° C. The sodium dissolved with evolution of hydrogen over three additional hours resulting in a clear solution. The mixture was then cooled to 35° C. using an ice bath, to provide a thick slurry. Carbon disulfide (73.80 grams, 0.97 moles) was added slowly over 30 minutes to the slurry followed by stirring for an additional 30 minutes to give a yellow solution. Solvent removal under vacuum gave a yellow solid which was further dried under high vacuum (1 millimeter Hg) for four hours. A yellow powder (136.7 grams), sodium isopropyl xanthate, was obtained.

Preparation of
1,1-bis(isopropoxycarbothioylsulfanyl)methyl
methyl ether (PI-1)

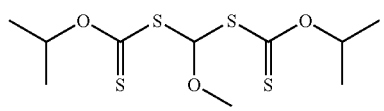 [SMILES: COC(SC(=S)OC(C)C)SC(=S)OC(C)C]

A mixture of SIX (7.57 grams, 48 millimoles) and acetone (30 milliliters) was cooled using an ice bath. A solution of dichloromethyl methyl ether (2.50 grams, 22 millimoles, TCI America, Portland, Oreg.) in acetone (5 milliliters) was added slowly over 15 minutes. After stirring at room temperature for three hours, the solvent was removed under vacuum. Ethyl acetate (30 milliliters) was added and the mixture was washed with water two times. The organic phase was concentrated under vacuum and the residual oil was purified by column chromatography over silica gel (1 to 15% ethyl acetate in hexanes). A yellow oil was isolated (5.82 grams). Proton NMR gave the following results: 7.06 (s, 1H), 5.76 (m, 2H), 3.54 (s, 3H), 1.40-1.41 (m, 12H).

Preparation of
1,1-bis(isopropoxycarbothioylsulfanyl)methyl butyl
ether (PI-2)

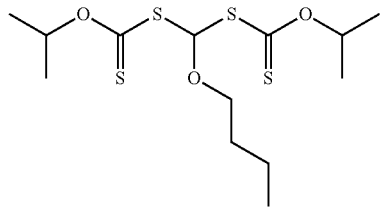 [SMILES: CCCCOC(SC(=S)OC(C)C)SC(=S)OC(C)C]

The procedure used to prepare 1,1-bis(isopropoxycarbothioylsulfanyl)methyl methyl ether was repeated with the following modifications. Dichloromethyl butyl ether (2.50 grams, 16 millimoles, TCI America) was used in place of dichloromethyl methyl ether; and the residual oil was purified by column chromatography over silica gel (1 to 10% ethyl acetate in hexanes). A yellow oil was isolated (4.79 grams). Proton NMR gave the following results: 7.06 (s, 1H), 5.76 (m, 2H), 3.73 (t, J=6.5 Hz, 2H), 1.52-1.61 (m, 2H), 1.32-1.45 (m, 14H), 0.89 (t, J=7.3 Hz, 3H).

Preparation of
1,1-bis(ethoxycarbothioylsulfanyl)methyl butyl
ether (PI-3)

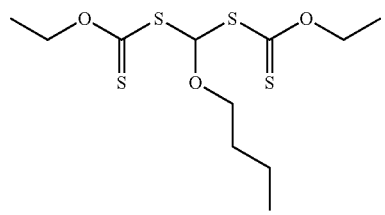 [SMILES: CCCCOC(SC(=S)OCC)SC(=S)OCC]

The procedure used to prepare 1,1-bis(isopropoxycarbothioylsulfanyl)methyl butyl ether was repeated with the following modifications. Potassium ethyl xanthate (5.61 grams, 35 millimoles, Alfa Aesar, Ward Hill, Mass.) was used in place of SIX; and the residual oil was purified by column chromatography over silica gel (1 to 10% ethyl acetate in hexanes). A yellow oil was isolated (3.91 grams). Proton NMR gave the following results: 7.08 (s, 1H), 4.65 (quartet, J=7.1 Hz, 4H), 3.75 (t, J=6.5 Hz, 2H), 1.54-1.62 (m, 2H), 1.43 (t, J=7.1, 6H), 1.32-1.9 (m, 2H), 0.89 (t, J=7.4 Hz, 3H).

Preparation of
1,1-bis(diethylcarbamothioylsulfanyl)methyl butyl
ether (PI-4)

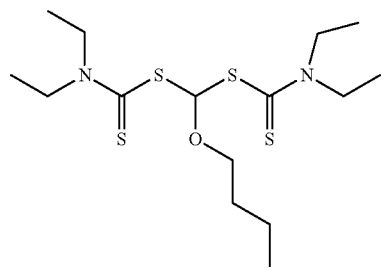 [SMILES: CCCCOC(SC(=S)N(CC)CC)SC(=S)N(CC)CC]

A mixture of sodium diethyldithiocarbamate trihydrate (7.89 grams, 35 millimoles, Alfa Aesar, Ward Hill, Mass.) and acetone (40 milliliters) was cooled using an ice bath. A solution of dichloromethyl butyl ether (2.50 grams, 16 millimoles, TCI America, Portland, Oreg.) in acetone (5 milliliters) was added slowly over 15 minutes. After stirring at room temperature for three hours, the solvent was removed under vacuum. Ethyl acetate (30 milliliters) was added and the mixture was washed with water two times. The organic phase was concentrated under vacuum and the residual oil was purified by column chromatography over silica gel (5 to 20% ethyl acetate in hexanes). A yellow oil was isolated (4.92 grams). Proton NMR gave the following results: 7.57 (s, 1H), 3.93-4.03 (m, 4H), 3.87 (t, J=6.6 Hz, 2H), 3.63-3.74 (m, 2H), 1.55-1.61 (m, 2H), 1.32-1.39 (m, 2H), 1.23-1.29 (m, 12H), 0.89 (t, J=7.4 Hz, 3H).

Preparation of
1,1-bis(10-undecenyloxycarbothioylsulfanyl)methyl
methyl ether (PI-5)

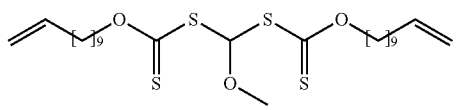

A mixture of sodium hydride dispersion (60% in mineral oil, 3.78 grams, 95 millimoles, Alfa Aesar, Ward Hill, Mass.) and diethyl ether (150 milliliters) was stirred under nitrogen. Next, 10-Undecen-1-ol (14.64 grams, 86 millimoles, Alfa Aesar, Ward Hill, Mass.) was added and the mixture was stirred for two hours. Carbon disulfide (6.90 grams, 91 millimoles, EMD Chemicals, Gibbstown, N.J.) was then added over 5 minutes. After stirring for one hour, hexane (200 milliliters) was added, and the mixture was filtered. The collected solid was washed once with hexane then dried under vacuum to give a yellow solid of sodium 10-undecenyl xanthate, 21.33 grams.

A mixture of sodium 10-undecenyl xanthate (6.00 grams, 22 millimoles) and acetone (28 milliliters) was cooled using an ice bath. A solution of dichloromethyl methyl ether (1.20 grams, 10 millimoles) in acetone (5 milliliters) was added slowly over 15 minutes. After stirring at room temperature for three hours, the solvent was removed under vacuum. Ethyl acetate (30 milliliters) was added and the mixture was washed with water. The organic phase was concentrated under vacuum and the residual oil was purified by column chromatography over silica gel (1 to 15% ethyl acetate in hexanes). A yellow oil was isolated (4.26 grams). Proton NMR gave the following results: 7.08 (s, 1H), 5.76-5.8 (m, 2H), 4.91-5.00 (m, 4H), 4.55-4.63 (m, 4H), 3.55 (s, 3H), 2.04 (quartet, J=7.6 Hz, 4H), 1.77-1.83 (m, 4H), 1.28-1.43 (m, 24H).

Preparation of methyl 2,2-bis(isopropoxycarbothioylsulfanyl)-2-methoxy-acetate (PI-6)

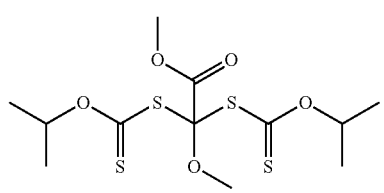 [SMILES: COC(=O)C(OC)(SC(=S)OC(C)C)SC(=S)OC(C)C]

A mixture of SIX (2.01 grams, 13 millimoles) and acetone (20 milliliters) was cooled using an ice bath. A solution of methyl dichloromethoxyacetate (1.00 gram, 6 millimoles, TCI America) was added slowly over 15 minutes. After stirring at room temperature for 72 hours, the solvent was removed under vacuum. Ethyl acetate (30 milliliters) was added and the mixture was washed with water. The organic phase was concentrated under vacuum and the residual oil was purified by column chromatography over silica gel (1 to 15% ethyl acetate in hexanes). A light yellow solid was isolated (0.52 grams). Proton NMR gave the following results: 5.63-5.71 (m, 2H), 3.84 (s, 3H), 3.60 (s, 3H), 1.36-1.40 (m, 12H).

Preparation of
(isopropoxycarbothioylsulfanyl)methyl octyl ether
(C1)

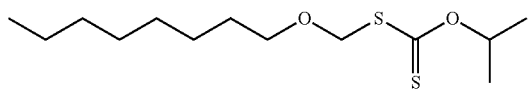 [SMILES: CCCCCCCCOCSC(=S)OC(C)C]

A mixture of SIX (3.90 grams, 25 millimoles) and acetone (50 milliliters) was cooled using an ice bath. A solution of chloromethyl octyl ether (4.00 grams, 22 millimoles, TCI America) was added slowly over 15 minutes. After stirring at room temperature for three hours, the solvent was removed under vacuum. Ethyl acetate (30 milliliters) was added and the mixture was washed with water two times. The organic phase was concentrated under vacuum and the residual oil was purified by column chromatography over silica gel (1 to 10% ethyl acetate in hexanes). A yellow oil was isolated (5.42 grams). Proton NMR gave the following results: 5.75-5.82 (m, 1H), 5.27 (s, 2H), 3.51 (t, J=6.6 Hz, 2H), 1.53-1.59 (m, 2H), 1.39 (d, J=6.3, 6H), 1.20-1.35 (m, 10H), 0.86 (t, J=7.1 Hz, 3H).

Preparation of Polymers

Examples 1-5 and Comparative Example 1:
Preparation of Poly(2EHA)

Various photoinitiators (PI) along with 2-ethylhexyl acrylate (2EHA), and ethyl acetate (EtOAc) were placed in screw cap vials. The solutions were purged with dry nitrogen for two minutes and the vials were then capped. The reaction vials were then placed on rollers under a UV lamp (OSRAM SYLVANIA F40/350BL BLACKLIGHT, peak wavelength of 352 nanometers, 40 Watt) at a distance of 10 centimeters from the lamp for various times. The light intensity on the vials measured at that distance was 1.25 milliWatts/square centimeter. Samples of each solution were taken for measurement of 2EHA conversion (by NMR) and molecular weights (by GPC). The results are shown in Table 1 below.

TABLE 1

NMR and GPC Results

| Ex. | PI | PI (grams) | 2EHA (grams) | EtOAc (grams) | Irradiation time (hours) | EHA conversion (mole %) | $M_w$ (g/mole) | $M_n$ (g/mole) | PDI |
|---|---|---|---|---|---|---|---|---|---|
| 1 | PI-2 | 0.050 | 5.001 | 5.260 | 2.8 | 92 | 44,100 | 23,200 | 1.9 |
| 2 | PI-3 | 0.051 | 4.998 | 5.172 | 2.8 | 93 | 38,700 | 21,400 | 1.8 |
| 3 | PI-4 | 0.050 | 5.051 | 5.125 | 18.4 | 92 | 59,700 | 32,800 | 1.8 |
| 4 | PI-5 | 0.050 | 5.009 | 5.010 | 3.0 | 94 | 128,700 | 49,900 | 2.6 |

TABLE 1-continued

NMR and GPC Results

| Ex. | PI | PI (grams) | 2EHA (grams) | EtOAc (grams) | Irradiation time (hours) | EHA conversion (mole %) | $M_w$ (g/mole) | $M_n$ (g/mole) | PDI |
|---|---|---|---|---|---|---|---|---|---|
| 5 | PI-6 | 0.042 | 5.011 | 5.053 | 6.0 | 97 | 49,900 | 27,300 | 1.8 |
| CE 1 | C-1 | 0.051 | 5.094 | 5.316 | 6.0 | 21 | 2,022,000 | 974,000 | 2.1 |

Example 6: Preparation of Poly(2EHA)

To the polymer solution of Example 1, was added 5.016 grams 2EHA and 5.2 grams EtOAc. The solution was purged with dry nitrogen for two minutes, then capped, and placed on rollers under a UV lamp (OSRAM SYLVANIA F40/350BL BLACKLIGHT, peak wavelength of 352 nanometers, 40 Watt) at a distance of 10 centimeters from the lamp. The light intensity on the vials measured at that distance was 125 milliWatts/square centimeters. After two hours, the solution was evaluated for percent conversion of 2EHA (by NMR) and molecular weights (by GPC). The percent conversion was 95.2 percent. $M_w$ was 85,900 grams/mole, $M_n$ was 43,300 grams/mole, and PDI was 2.0.

Example 7: Preparation of Poly(2EHA)-Poly(IBOA) Block Copolymer

To the polymer solution of Example 2, was added 5.089 grams isobornyl acrylate (IBOA, San Esters, New York, N.Y.) and 5.583 grams EtOAc. The solution was purged with dry nitrogen for two minutes, then capped, and placed on rollers under a UV lamp as described for Example 6. After two hours, the solution of the block copolymer was evaluated for percent conversion of IBOA (by NMR) and molecular weights (by GPC). The percent conversion was 88 percent. $M_w$ was 68,300 grams/mole, $M_n$ was 35,800 grams/mole, and PDI was 1.9.

Example 8: Preparation of Poly(BA) Using PI-1 and UV Irradiation

A solution was prepared containing 15.0 grams (117 millimoles) of butyl acrylate (BA) and 0.103 grams (0.33 millimoles) PI-1. Aliquots of approximately 1 gram of this solution were added to individual vials, purged with nitrogen for two minutes, and then sealed. The vials were irradiated with a UV lamp (OSRAM SYLVANIA F15T8/BLB Blacklight Blue, peak wavelength of 362 nanometers) placed 12.7 centimeters above the vials. The light intensity on the vials measured at that distance was 0.7 milliWatts/square centimeter. The vials were removed from the light at various time intervals and evaluated for monomer conversion (gravimetrically and by NMR), molecular weights (by GPC and NMR), fraction of free initiator, and fraction of mono-directional polymer chains. The results are shown in Tables 2 and 3.

The gravimetric weight percent (wt %) conversion of monomer was determined by recording the weight of the sample, heating the sample at 120° C. for two hours, and then measuring the final weight. The wt % conversion was calculated as follows.

Wt % Conversion=100×(final weight/initial weight).

One and two dimensional (2D) NMR experiments were run to assign the free initiator and different polymer end groups, molecular weight, and percent monomer conversion. The methyl ether resonance of PI-1 was used to track the amount of free initiator, mono-directional, and bi-directional polymer chains. The assignments determined from 2D NMR analysis were 3.56 ppm for free initiator, 3.39 ppm for mono-directional polymer chains, and 3.20 ppm for bi-directional polymer chains (see FIG. 1). The gHMBC correlation experiment for the 3.39 ppm resonance to the methine thioketal at 91.2 ppm ($^{13}$C) is distinctive for mono-directional polymer chains. The 3.20 ppm resonance has a correlation to a $^{13}$C at 77.0 ppm, indicative of an ether resonance for the bi-directional species. Each resonance was divided by 3 (number of protons) to determine the molar amount of each species and quantitative values given in Table 3 below were calculated as described in the NMR Analysis test method above.

TABLE 2

Gravimetric and GPC Results

| Example | Time (minutes) | Conversion (wt %) | $M_w$ (grams/mole) | $M_n$ (grams/mole) | PDI |
|---|---|---|---|---|---|
| 8-1 | 6 | 22 | 19,800 | 10,500 | 1.9 |
| 8-2 | 8 | 23 | 28,000 | 13,500 | 2.1 |
| 8-3 | 13 | 56 | 51,100 | 26,800 | 1.9 |
| 8-4 | 17 | 69 | 58,000 | 32,200 | 1.8 |
| 8-5 | 30 | 85 | 66,000 | 34,000 | 1.9 |

| Example | Time (minutes) | Conversion (mole %) | $M_n$ (grams/mole) | Fraction of free initiator (%) | Fraction of mono-directional polymer chains (%) |
|---|---|---|---|---|---|
| 8-1 | 6 | 11 | 12,200 | 52 | 100 |
| 8-2 | 8 | 24 | 15,200 | 20 | 95 |
| 8-3 | 13 | 54 | 28,200 | 1 | 93 |
| 8-4 | 17 | 69 | 33,200 | 0 | 90 |
| 8-5 | 30 | 89 | 42,200 | 0 | 86 |

Table 3: NMR Results

The NMR results demonstrate that photoinitiator PI-1 rapidly initiates polymerization, however, the propagation mostly occurs from only one xanthate group. Therefore, these initiators are useful to prepare diblock acrylic polymers that will contain small amounts of triblock polymers.

Example 9: Preparation of Poly(BA) Using PI-1 and LED Irradiation

Example 8 was repeated with the following modifications. The vials were irradiated with light emitting diodes (LED) using a 365 nanometer LED array (Model LED365-0556 LED Bank, Clearstone Technologies, Incorporated) at a power setting of 50% and a distance of 3 inches from the nearest vial edge. The total energy provided after an exposure time often seconds was 631 milliJoules/square centimeter at the surface of the solution. One and two dimensional (2D) NMR experiments were run to assign the free initiator and different polymer end groups, molecular weight, and % monomer conversion. The NMR spectral assignments were the same as for Example 8.

TABLE 4

NMR Results

| Example | Irradiation time (seconds) | Conversion (mole %) | $M_n$ (grams/ mole) | Fraction of free initiator (%) | Fraction of mono-directional polymer chains (%) |
|---|---|---|---|---|---|
| 9-1 | 5 | 8 | 10,600 | 63 | 100 |
| 9-2 | 10 | 18 | 13,100 | 32 | 98 |
| 9-3 | 15 | 31 | 17,600 | 11 | 96 |
| 9-4 | 30 | 57 | 30,700 | 1 | 89 |
| 9-5 | 45 | 74 | 39,400 | 0.3 | 77 |
| 9-6 | 60 | 84 | 47,000 | 0 | 72 |
| 9-7 | 90 | 90 | 48,800 | 0 | 68 |
| 9-8 | 120 | 92 | 44,800 | 0 | 75 |

Example 10: Preparation of Poly(2EHA) Using PI-6 and UV Irradiation

The procedure of Example 8 was repeated with the following modifications. A solution containing 15.0 grams (81 millimoles) of 2EHA and 0.103 grams (0.28 millimoles) PI-6 was used in place of a solution of BA and PI-1.

Figure 2:
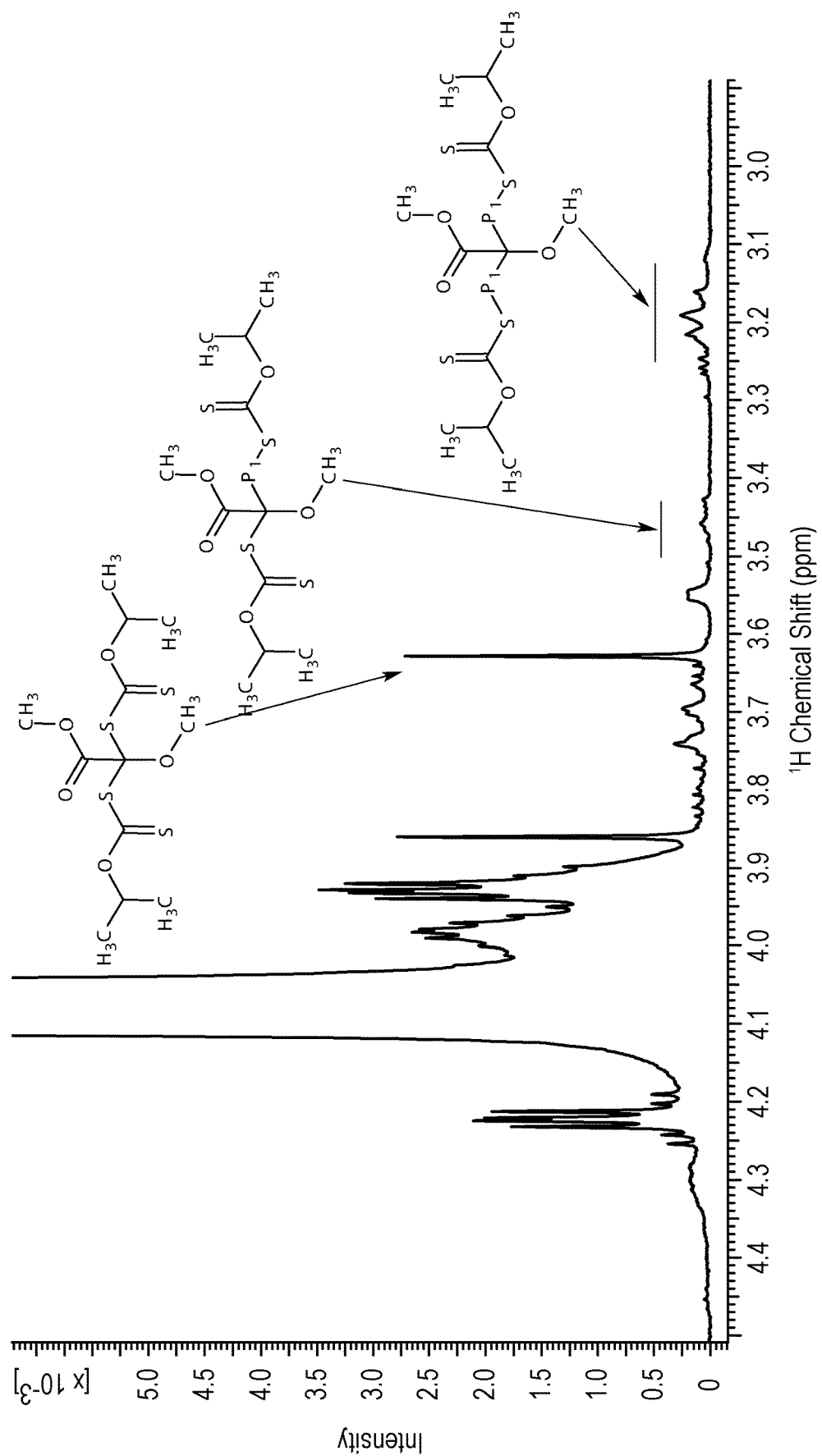
FIG. 2 shows the 2.9 to 4.5 ppm region of the $^1H$ NMR spectrum for Example 10-2 after 3 percent conversion of the monomers.

One and two dimensional (2D) NMR experiments were run to assign the free initiator and different polymer end groups, molecular weight, and conversion. The methyl ether resonance of PI-6 was used to track the amount of free initiator, mono-directional, and bi-directional polymer chains. The assignments determined from 2D NMR analysis were 3.63 ppm for free initiator, 3.41-3.49 ppm for mono-directional polymer chains, and 3.08-3.24 ppm for bi-directional polymer chains (see FIG. 2). The gHMBC correlation experiment for the 3.41-3.49 ppm resonance to the quaternary thioketal at 93.2 ppm ($^{13}C$) is distinctive for mono-directional polymer chains. The 3.08-3.24 ppm resonances have a correlation to a $^{13}C$ at 80.6 ppm, indicative of an ether resonance for the bi-directional species. Each resonance was divided by 3 (number of protons) to determine the molar amount of each species and quantitative values given in Table 5 below were calculated as described in the NMR Analysis test method above.

TABLE 5

NMR Results

| Example | Irradiation time (minutes) | Conversion (mole %) | Mw (grams/ mole) | Fraction of free initiator (%) | Fraction of mono-directional polymer chains (%) |
|---|---|---|---|---|---|
| 10-1 | 3.0 | 1 | 1,790 | 77 | 21 |
| 10-2 | 7.0 | 3 | 3,510 | 42 | 19 |
| 10-3 | 9.0 | 10 | 8,190 | 6 | 17 |
| 10-4 | 12.0 | 18 | 10,600 | 0 | 18 |
| 10-5 | 13.0 | 28 | 19,200 | 0 | 13 |
| 10-6 | 13.5 | 46 | 31,800 | 0 | 9 |
| 10-7 | 14.0 | 53 | 40,800 | 0 | 0 |
| 10-8 | 17.0 | 55 | 43,200 | 0 | 0 |
| 10-9 | 22.0 | 89 | 64,900 | 0 | 0 |

Compared to PI-1, the initiator PI-6 with both ether and ester substitution on the geminal carbon (PI-6) initiates more efficiently from both xanthate groups.

Example 11: Preparation of Poly(2EHA) Using PI-1 and LED Irradiation

A solution of 25.0 grams 2EHA, 25.0 grams ethyl acetate, and 0.12 grams PI-1 was placed in a 2-necked round bottom flask and degassed with a nitrogen stream for 15 minutes. The flask was then held under a positive pressure of nitrogen, stirred magnetically, and irradiated with an LED array as described in Example 9 at a distance of 1 inch from the nearest flask edge. To one neck of the flask was attached the probe of a ReactIR 15 in-situ IR spectrometer (Mettler Toledo Autochem, Redmond, Va.). The probe tip was maintained below the surface of the reaction solution and a spectrum recorded every minute for the first 30 minutes, every five minutes for the next 1.5 hours, and every fifteen minutes for the remainder of the experiment. The percent monomer consumption was calculated by determining the peak height of the C=C stretching band at 1639 cm-1 defined from a two point baseline from 1650 $cm^{-1}$ to 1610 $cm^{-1}$. The weight percent monomer conversion was calculated as:

Wt % Monomer Conversion=100×(peak height/time zero peak height).

Samples of the solution, about 3 mL in volume, were taken at various irradiation times and the molecular weights were determined by GPC. The monomer conversion and molecular weight results (by GPC) are shown in Table 6.

TABLE 6

Conversion and Molecular Weight Results

| Example | Irradiation time (minutes) | Conversion (wt %) | $M_n$ (grams/mole) | $M_w$ (grams/mole) | PDI |
|---|---|---|---|---|---|
| 11-1 | 0.9 | 30 | 15,100 | 31,900 | 2.1 |
| 11-2 | 1.3 | 42 | 18,700 | 43,000 | 2.3 |
| 11-3 | 1.8 | 54 | 23,200 | 53,400 | 2.3 |
| 11-4 | 2.5 | 60 | 27,500 | 61,600 | 2.2 |
| 11-5 | 8 | 81 | 35,200 | 70,000 | 2.0 |
| 11-6 | 21.1 | 91 | 33,900 | 74,000 | 2.2 |
| 11-7 | 31 | 94 | 31,300 | 72,400 | 2.3 |

Examples 12-15: Preparation of Adhesive Tapes

Compositions were prepared by charging a 200 milliliter jar with 90 grams of 2EHA (BASF Corporation, Florham Park, N.J.), 10 grams of acrylic acid (AA, BASF Corporation), and 0.04 grams of PI-1. The monomer mixture was purged with nitrogen for ten minutes then exposed to an OSRAM SYLVANIA F40/350BL BLACKLIGHT (peak wavelength of 352 nanometers, 40 Watt) at a distance of 10 centimeters from the lamp with mixing until a polymeric syrup having a Brookfield viscosity of 100 to 8000 centiPoise was formed. The 2EHA conversion was found, by NMR, to be 24.5 mole %. The molecular weight of the syrup was found to be, by GPC, Mw: 214620; Mn: 97024; PDI: 2.21.

To the polymeric syrup thus obtained were added 2,2-dimethoxy-2-phenylacetophenone, (IRGACURE 651; BASF, Corporation), hexanediol diacrylate (HDDA), and PI-1 in the amounts shown in Table 7. These were mixed for one hour to give pre-adhesive syrup compositions. These compositions were then knife coated between a polyester release liner and the primed surface of 0.002 inch (127 micrometers) thick primed poly(ethylene terephthalate) film (HOSTAPHAN 3 SAB PET film, Mitsubishi Polyester Film, Greer, S.C.) at a thickness of 0.002 inches (127 micrometers). The coated compositions were irradiated for twelve minutes using UVA lamps (OSRAM SYLVANIA F40/350BL BLACKLIGHT, peak wavelength of 352 nanometers, 40 Watt) to provide total UVA energy of 2450 milliJoules/square centimeter. The resulting adhesive tapes were evaluation for shear strength at 70° C. and for 180 degree angle peel adhesion strength at room temperature as described in the test methods above. The results are shown in Table 7.

TABLE 7

Compositions, Peel, and Shear Results

| Example | Polymeric Syrup (grams) | PI-1 (grams) | IRGACURE 651 (grams) | HDDA (grams) | Peel Adhesion Strength to SS oz/in (N/dm) | Shear Strength at 70° C. to SS (minutes) |
|---|---|---|---|---|---|---|
| 12 | 20.00 | 0.032 | 0.000 | 0.020 | 44.5 (48.5) | 6 |
| 13 | 20.00 | 0.021 | 0.011 | 0.020 | 51.7 (56.4) | 380 |
| 14 | 20.00 | 0.011 | 0.021 | 0.020 | 55.0 (60.0) | 162 |
| 15 | 20.00 | 0.000 | 0.032 | 0.020 | 57.1 (62.2) | 10,000+ |

Examples 16-19: Preparation of Adhesive Tapes

Adhesive tapes were prepared using the procedure described for Examples 12-15 with the following modifications. The polymeric syrup was prepared by charging a 100 milliliter jar with 66.08 grams of 2EHA, 0.32 grams of AA, 13.60 grams of IBOA, and 0.029 g of PI-2. This composition was then inerted (purged with nitrogen) and exposed to UVA light to provide a polymeric syrup having a Brookfield viscosity of 1750 centiPoise. The 2EHA conversion was 24 mole % and IBOA conversion was 25 mole %, both by NMR.

To the polymeric syrup thus obtained were added IRGACURE 651, and HDDA, and REGALREZ 6108 (Eastman Chemical, Kingsport, Tenn.) in the amounts shown in Table 8. These were mixed for 16 hours to give pre-adhesive syrup compositions. These compositions were then coated and cured as described for Examples 12-15, with the following modifications. The exposure time was ten minutes and the total UVA energy provided was 2100 milliJoules/square centimeter. The resulting adhesive tapes were evaluation for 180 degree angle peel adhesion strength at room temperature as described in the test method above. The results are shown in Table 8.

TABLE 8

Compositions and Peel Results

| Example | Polymeric Syrup (grams) | IRGACURE 651 (grams) | HDDA (grams) | REGALREZ 6108 (grams) | Peel Adhesion Strength to SS oz/in (N/dm) |
|---|---|---|---|---|---|
| 16 | 15.00 | 0.025 | 0.015 | 0.00 | 53 (58) |
| 17 | 15.01 | 0.025 | 0.018 | 3.00 | 122 (133) |
| 18 | 15.01 | 0.024 | 0.017 | 4.50 | 116 (127) |
| 19 | 15.01 | 0.025 | 0.016 | 6.00 | 140 (153) |

What is claimed is:

1. A polymeric material of Formula (II)

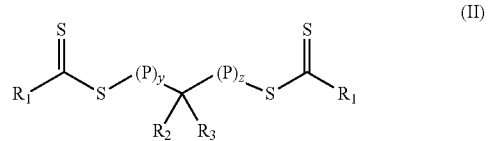

wherein
each $R_1$ is an alkoxy, aryloxy, alkenoxy, or —$N(R_4)_2$;
$R_2$ is a group of formula —$(OR_5)_x$—$OR_6$;
$R_3$ is a hydrogen, alkyl, aryl, a group of formula —(CO)$OR_7$, or a group of formula —(CO)$N(R_8)_2$;
each $R_4$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic;
each $R_5$ is an alkylene;
$R_6$ is an alkyl;
$R_7$ is an alkyl or aryl;
each $R_8$ is an alkyl or aryl;
each P is a polymeric block that comprises a polymerized product of a first monomer composition comprising at least one monomer having a single ethylenically unsaturated group;
x is an integer of at least 0;
y is an integer in a range of 1 to 10; and
z is an integer in a range of 0 to y.

2. The polymeric material of claim 1, wherein y is equal to 1 and z is in a range of 0 to 1.

3. The polymeric material of claim 1, wherein y is equal to 2 and z is in a range of 0 to 2.

4. The polymeric material of claim 1, wherein y is equal to 3 and z is in a range of 0 to 3.

5. The polymeric material of claim 1, wherein $R_3$ is —(CO)$OR_7$.

6. A crosslinkable composition comprising:
a) a polymeric material of Formula (II)

wherein
- each $R_1$ is an alkoxy, aryloxy, alkenoxy, or —$N(R_4)_2$;
- $R_2$ is a group of formula —$(OR_5)_x$—$OR_6$;
- $R_3$ is a hydrogen, alkyl, aryl, a group of formula —$(CO)OR_7$, or a group of formula —$(CO)N(R_8)_2$,
- each $R_4$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic;
- each $R_5$ is an alkylene;
- $R_6$ is an alkyl;
- $R_7$ is an alkyl or aryl;
- each $R_8$ is an alkyl or aryl;
- each P is a polymeric block that comprises a polymerized product of a first monomer composition comprising at least one monomer having a single ethylenically unsaturated group;
- x is an integer of at least 0;
- y is an integer in a range of 1 to 10; and
- z is an integer in a range of 0 to y; and b) a second monomer composition comprising a crosslinking monomer having at least two ethylenically unsaturated groups.

7. The crosslinkable composition of claim 6, wherein the second monomer composition further comprises a monomer having a single ethylenically unsaturated group.

8. The crosslinkable composition of claim 6, wherein the crosslinkable composition comprises 1) 5 to 99.99 weight percent polymeric material of Formula (II) and 2) a second monomer composition comprising a) 0.01 to 20 weight percent crosslinking monomer having at least two ethylenically unsaturated groups, and b) 0 to 95 weight percent monomer having a single ethylenically unsaturated group, wherein each amount is based on a total weight of polymerized and polymerizable material.

9. The crosslinkable composition of claim 6, wherein the crosslinkable composition further comprises a photoinitiator.

10. The crosslinkable composition of claim 6, wherein the polymeric material is an elastomeric material and wherein the crosslinkable composition further comprises a tackifier.

11. A crosslinked composition comprising a cured product of a crosslinkable composition, the crosslinkable composition comprising:

a) a polymeric material of Formula (II)

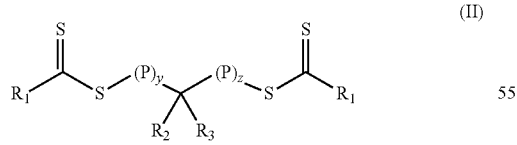

wherein
- each $R_1$ is an alkoxy, aryloxy, alkenoxy, or —$N(R_4)_2$;
- $R_2$ is a group of formula —$(OR_5)_x$—$OR_6$;
- $R_3$ is a hydrogen, alkyl, aryl, a group of formula —$(CO)OR_7$, or a group of formula —$(CO)N(R_8)_2$,
- each $R_4$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic;
- each $R_5$ is an alkylene;
- $R_6$ is an alkyl;
- $R_7$ is an alkyl or aryl;
- each $R_8$ is an alkyl or aryl;
- each P is a polymeric block that comprises a polymerized product of a first monomer composition comprising at least one monomer having a single ethylenically unsaturated group;
- x is an integer of at least 0;
- y is an integer in a range of 1 to 10; and
- z is an integer in a range of 0 to y; and b) a second monomer composition comprising a crosslinking monomer having at least two ethylenically unsaturated groups.

12. An article comprising a first substrate and a crosslinked composition layer adjacent to the first substrate, wherein the crosslinked composition layer includes a cured product of a crosslinkable composition of claim 11.

13. A first reaction mixture comprising:
a) a photoinitiator of Formula (I)

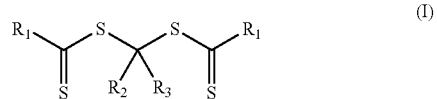

wherein
- each $R_1$ is an alkoxy, aryloxy, alkenoxy, or —$N(R_4)_2$;
- $R_2$ is a group of formula —$(OR_5)_x$—$OR_6$;
- $R_3$ is a hydrogen, alkyl, aryl, a group of formula —$(CO)OR_7$, or a group of formula —$(CO)N(R_8)_2$,
- each $R_4$ is an alkyl or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic;
- each $R_5$ is an alkylene;
- $R_6$ is an alkyl;
- $R_7$ is an alkyl or aryl;
- each $R_8$ is an alkyl or aryl;
- x is an integer of at least 0; and b) a first monomer composition containing at least one monomer having a single ethylenically unsaturated group.

* * * * *

UNITED STATES PATENT AND TRADEMARK OFFICE
CERTIFICATE OF CORRECTION

PATENT NO. : 10,640,687 B2
APPLICATION NO. : 16/495586
DATED : May 5, 2020
INVENTOR(S) : Kevin Lewandowski et al.

It is certified that error appears in the above-identified patent and that said Letters Patent is hereby corrected as shown below:

In the Specification

Column 5
Line 37, Delete "Rc" and insert -- $R^c$ --, therefor.

Column 9
Line 43, Delete "(1-4))" and insert -- (I-4)) --, therefor.

Column 34
Line 22, Delete "—(OR)—$OR_6$." and insert -- —$(OR_5)_x$—$OR_6$. --, therefor.

Column 35
Line 50, Delete "—$(OR_8)_x$—$OR_6$." and insert -- —$(OR_5)_x$—$OR_6$. --, therefor.

Column 36
Line 36, Delete "—$(OR_8)_x$—$OR_6$." and insert -- —$(OR_5)_x$—$OR_6$. --, therefor.

Column 38
Line 23, Delete " 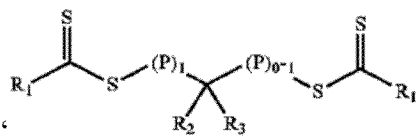 " and
insert -- 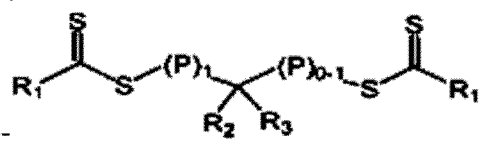 --, therefor.

Column 43
Line 54, Delete "(150)" and insert -- (15°) --, therefor.

Signed and Sealed this
Fourteenth Day of July, 2020

Andrei Iancu
*Director of the United States Patent and Trademark Office*

CERTIFICATE OF CORRECTION (continued)
U.S. Pat. No. 10,640,687 B2

Column 44
Line 48, Delete "Mn" and insert -- $M_n$ --, therefor.

In the Claims

Column 55
Line 5, In Claim 6, delete "—(CO)N($R_8$)$_2$," and insert -- —(CO)N($R_8$)$_2$; --, therefor.

Column 56
Line 2, In Claim 11, delete "—(CO)N($R_8$)$_2$," and insert -- —(CO)N($R_8$)$_2$; --, therefor.
Line 44, In Claim 13, delete "—(CO)N($R_8$)$_2$," and insert -- —(CO)N($R_8$)$_2$; --, therefor.